(12) United States Patent
Edge et al.

(10) Patent No.: US 8,751,601 B2
(45) Date of Patent: Jun. 10, 2014

(54) USER INTERFACE THAT PROVIDES RELEVANT ALTERNATIVE LINKS

(75) Inventors: Simon Richard Edge, Ringwood (GB);
Shane Lee Ambridge, Ringwood (GB)

(73) Assignee: Barefruit Limited, Winchmore Hill, London (GB)

( * ) Notice: Subject to any disclaimer, the term of this patent is extended or adjusted under 35 U.S.C. 154(b) by 89 days.

(21) Appl. No.: 11/465,564

(22) Filed: Aug. 18, 2006

(65) Prior Publication Data

US 2007/0033264 A1 Feb. 8, 2007

(30) Foreign Application Priority Data

Jul. 22, 2004 (GB) .................................. 0416405.9
Jan. 28, 2005 (GB) .................................. 0501851.0
Jul. 19, 2005 (WO) ............... PCT/GB2005/002835

(51) Int. Cl.
*G06F 15/16* (2006.01)

(52) U.S. Cl.
USPC ............................ 709/217; 709/219; 715/854

(58) Field of Classification Search
CPC ........ H04L 67/02; H04L 69/329; H04L 69/40
USPC ............... 709/217, 200, 203, 219; 707/104.1; 715/854
See application file for complete search history.

(56) References Cited

U.S. PATENT DOCUMENTS

| | | | |
|---|---|---|---|
| 5,751,961 A | 5/1998 | Smyk | |
| 6,092,100 A | 7/2000 | Berstis et al. | |
| 6,134,680 A * | 10/2000 | Yeomans | 714/57 |
| 6,202,087 B1 | 3/2001 | Gadish | |
| 6,269,460 B1 * | 7/2001 | Snover | 714/48 |
| 6,332,158 B1 | 12/2001 | Risley et al. | |
| 6,590,588 B2 * | 7/2003 | Lincke et al. | 715/744 |
| 6,594,697 B1 | 7/2003 | Praitis et al. | |
| 6,687,732 B1 * | 2/2004 | Bector et al. | 709/200 |
| 6,742,030 B1 | 5/2004 | MacPhail | |
| 6,832,239 B1 * | 12/2004 | Kraft et al. | 709/203 |
| 7,188,138 B1 * | 3/2007 | Schneider | 709/203 |

(Continued)

FOREIGN PATENT DOCUMENTS

| | | |
|---|---|---|
| EP | 1471714 | 10/2006 |
| JP | 2003058552 | 2/2003 |
| WO | WO 2004040474 | 5/2004 |

OTHER PUBLICATIONS

International Search Report.

(Continued)

*Primary Examiner* — Jungwon Chang
(74) *Attorney, Agent, or Firm* — Leason Ellis LLP

(57) ABSTRACT

There is disclosed an improved user interface for a network, for example the Internet. If a user clicks on an incorrect hyperlink then the system, instead of merely informing the user that an error (e.g. "404 Not Found" error—meaning that the requested web page is not available) has occurred, provides the user with a list (503) of hyperlinks to alternative web pages. The alternative web pages are related to the context of the web page that was originally requested by the user (but was not available, due to the incorrect hyperlink, to the user). In a preferred embodiment (300), the system analyzes a web page (201) (i.e. the web page that contained the incorrect hyperlink) for context information and uses the context information to improve the relevance to the user of the list (503). The system may also analyze other web pages for context information.

66 Claims, 7 Drawing Sheets

(56) References Cited

U.S. PATENT DOCUMENTS

| | | | |
|---|---|---|---|
| 7,277,924 B1* | 10/2007 | Wichmann et al. | 709/217 |
| 7,284,160 B2* | 10/2007 | Skog et al. | 714/43 |
| 7,325,045 B1* | 1/2008 | Manber et al. | 709/219 |
| 7,360,160 B2* | 4/2008 | Matz | 715/716 |
| 7,756,996 B2* | 7/2010 | Touboul | 709/236 |
| 2002/0002602 A1* | 1/2002 | Vange et al. | 709/219 |
| 2002/0056053 A1* | 5/2002 | Vine et al. | 714/4 |
| 2002/0059396 A1 | 5/2002 | Holzer et al. | |
| 2002/0099723 A1* | 7/2002 | Garcia-Chiesa | 707/200 |
| 2002/0116495 A1* | 8/2002 | Hutten | 709/225 |
| 2002/0156917 A1* | 10/2002 | Nye | 709/238 |
| 2002/0198937 A1* | 12/2002 | Diwan et al. | 709/203 |
| 2003/0018694 A1* | 1/2003 | Chen et al. | 709/200 |
| 2003/0018714 A1* | 1/2003 | Mikhailov et al. | 709/203 |
| 2003/0074400 A1* | 4/2003 | Brooks et al. | 709/203 |
| 2003/0135548 A1 | 7/2003 | Bushkin | |
| 2004/0019697 A1* | 1/2004 | Rose | 709/245 |
| 2004/0111492 A1* | 6/2004 | Nakahara et al. | 709/219 |
| 2004/0215664 A1* | 10/2004 | Hennings et al. | 707/104.1 |
| 2005/0268219 A1* | 12/2005 | Roma i Dalfo | 715/512 |
| 2005/0289084 A1* | 12/2005 | Thayer et al. | 705/67 |
| 2006/0053213 A1* | 3/2006 | Seeman | 709/218 |
| 2008/0016233 A1* | 1/2008 | Schneider | 709/230 |
| 2010/0281311 A1* | 11/2010 | Gao et al. | 714/49 |

OTHER PUBLICATIONS

English translation of the abstract for JP 2003058552 (published Feb. 28, 2003).

* cited by examiner

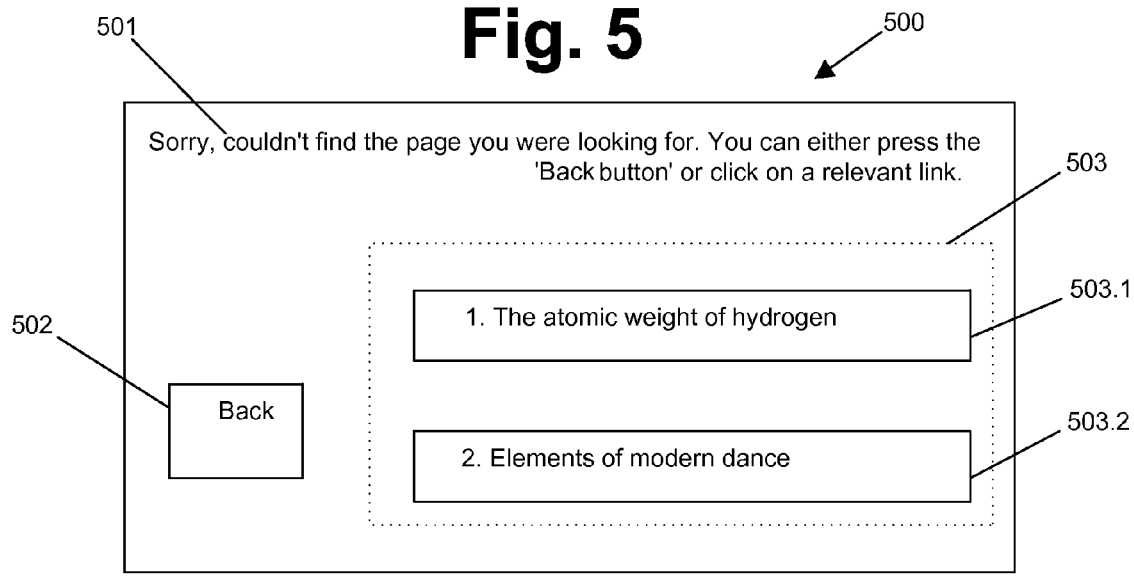
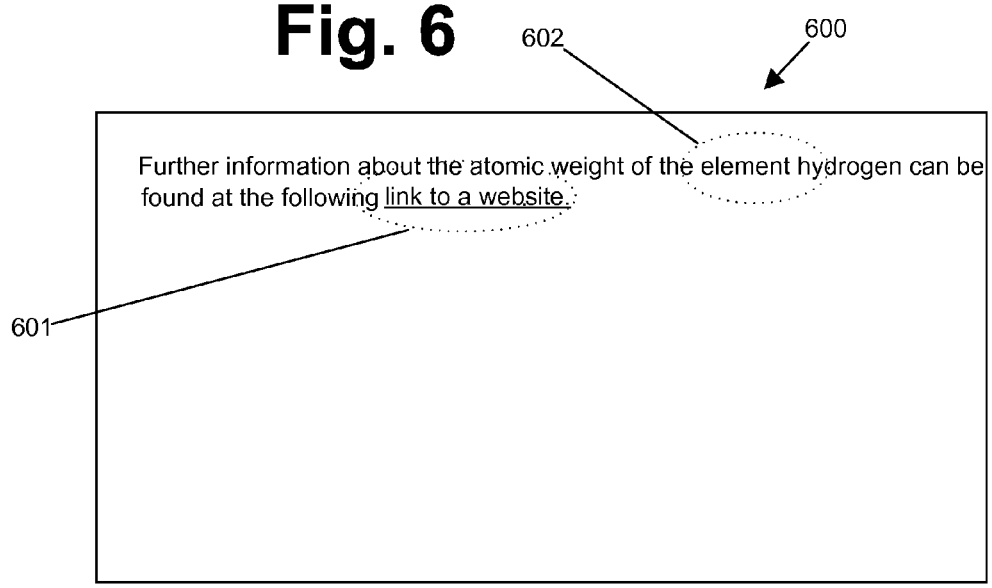

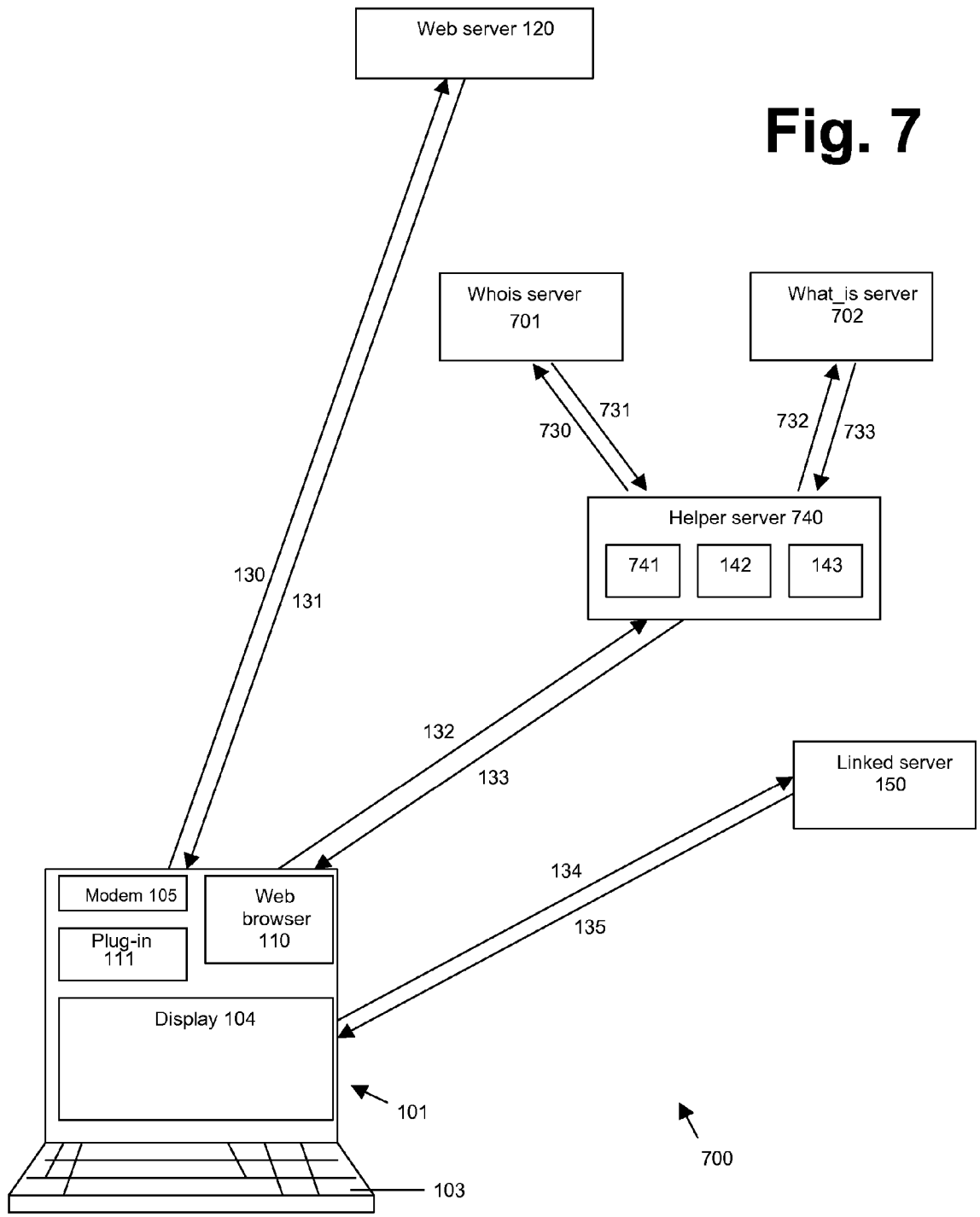

USER INTERFACE THAT PROVIDES RELEVANT ALTERNATIVE LINKS

CROSS REFERENCE TO RELATED CASES

This application claims the benefit of International Patent Application Number PCT/GB2005/002835 filed on Jul. 19, 2005 and entitled "IMPROVED USER INTERFACE", which claims the benefit of both Application Number GB 0501851.0 filed in the United Kingdom on Jan. 28, 2005, and Application Number GB 0416405.9 filed in the United Kingdom on Jul. 22, 2004, where all of the applications listed above are incorporated herein by reference in their entirety.

BACKGROUND

The various embodiments of the invention relate to an improved user interface for a telecommunications apparatus that can receive data from, and transmit data to, other telecommunication apparatuses. More particularly, but not exclusively, the various embodiments of the invention relate to an improved user interface for an Internet web browser.

Sometimes, when a user uses a web browser to view internet pages, the user will type the web page address (also known as a Uniform Resource Locator or "URL") into the web browser. Alternatively, the user may use a "bookmark" specifying a web page address. The web page address both specifies a particular machine connected to the internet, and also specifies a particular web resource (such as a specific web server name or specific web page) on that machine. The web browser then transmits a request for the desired page to the web server, as a result of which the web server returns information to the web browser that defines the appearance of the web page. Sometimes, the web address validly specifies the internet address of a web server but does not validly specify a web page on the particular web server. For example, the user may either (i) incorrectly enter the internet address of the desired page, or (ii) may enter the resource address (path) of a web page that previously existed but no longer exists. In such cases the web server will return an error code to the user's web browser. A typical error code is hyper text transfer protocol (HTTP) "404 Not Found" although there are also various other error codes such as "410 Gone". A user receiving such messages thus learns only that the specified web page does not exist, without any further reasons or useful information being provided.

In some cases, the web server may direct a user to the website's homepage, in the event that the user requests a page that is not available on the server, but this is usually of limited usefulness or interest to the user whose actions in specifying a particular web page within a web site are typically indicative of a specific interest.

SUMMARY

Against this background, and in accordance with a first aspect of the invention, there is provided a system as set out in claim 1.

According to a second aspect of the invention, there is provided a plug-in for a web browser, as set out in claim 36.

According to a third aspect of the invention, there is provided a proxy add-in for a proxy server, as set out in claim 40.

According to a fourth aspect of the invention, there is provided a server for modifying the behaviour of a proxy server, as set out in claim 43.

According to a fifth aspect of the invention, there is provided an error handler for a web server, as set out in claim 52.

According to a sixth aspect of the invention, there is provided a DNS add-in for a DNS server, as set out in claim 55.

According to a seventh aspect of the invention, there are provided helper servers as set out in claims 57 and 59.

According to an eighth aspect of the invention, there is provided an error code receiver as set out in claim 61.

According to a ninth aspect of the invention, there is provided a method of providing an improved user interface as set out in claim 66.

An advantage of various embodiments of the present invention is that rather than merely presenting the user with an error code indicating that the requested web page could not be retrieved, the user is presented with one or more alternative links that are relevant to the web page that the user was attempting to view. The user can then click on one or more of the links. Thus, the various embodiments of the invention can provide constructive suggestions of alternative web pages when the originally requested web page does not exist.

BRIEF DESCRIPTION OF THE DRAWINGS

Embodiments of the invention will now be described by way of example only and with reference to the following drawings in which:

FIG. 5 illustrates a web page as seen by a user of the system of FIG. 1, following entry of a non-existent URL;

FIG. 6 illustrates a web page, as seen by a user of the system of FIG. 2, following processing of a data entry by that system;

FIG. 7 illustrates a computer system arranged in accordance with a sixth embodiment of the invention.

DETAILED DESCRIPTION

First Embodiment

Figure 1:
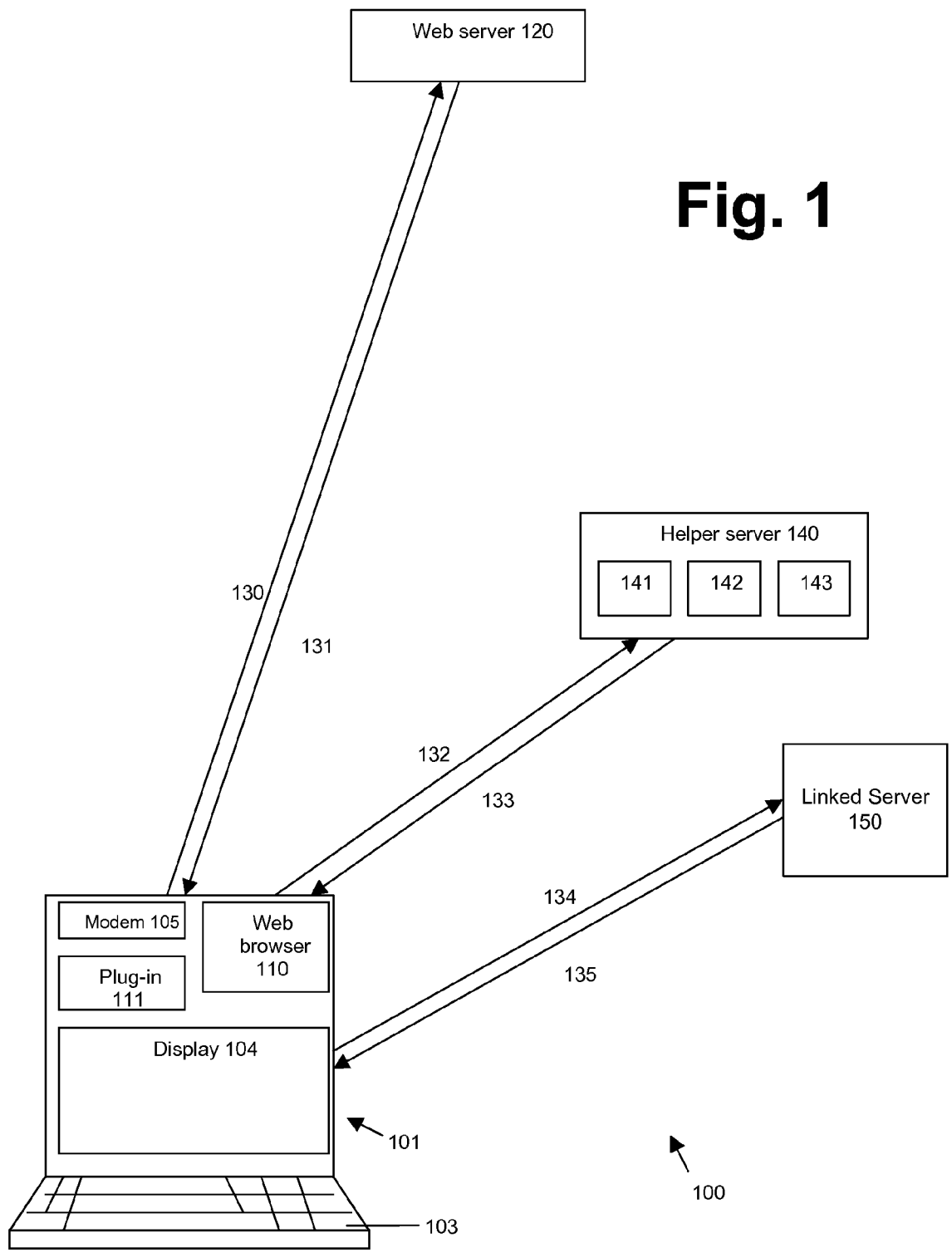
FIG. 1 illustrates a computer system arranged in accordance with a first embodiment of the invention.

FIG. 1 shows a system 100 according to a first embodiment of the invention.

The system 100 comprises a user's personal computer (PC) 101. The user's PC 101 has standard accessories such as a mouse (not shown), a keyboard 103 and a screen 104 that can be used for displaying web pages. The user's PC 101 also has a modem 105 which allows the user's PC 101 to be connected to the internet. In this embodiment, the user's PC 101 is a desktop PC although in other embodiments, the user's PC 101 could, for example, be a mobile telephone or a personal digital assistant (PDA) or any other terminal having a processor configured by executing software instructions stored in a memory and a web browser operable to request web pages on behalf of the user.

The user's PC 101 is provided with web browser software 110. The web browser software 110 may, for example, be the Microsoft® Internet Explorer®, Netscape Navigator® or Mozilla®. In use, a user enters a URL for a web page, usually via keystrokes on the keyboard 103. This results in the browser software sending a request to the web server specified by the entered URL. Where such a URL exists, that web server returns instructions to the browser software 110 at the user's PC 101, and that browser software 110 interprets the received information and then displays the requested web page on the screen 104. As will be well known to those skilled in the art, the information sent by the web server and interpreted by the browser software 110 is typically encoded using the hypertext markup language (HTML) and is delivered using the hypertext transfer protocol (HTTP) protocol. Details of the HTTP protocol and related protocols may be found on the internet at the following web addresses (note that the following documents are incorporated by reference):

```
http://www.ietf.org/rfc/rfc1945.txt
Hypertext Transfer Protocol -- HTTP/1.0
http://www.ietf.org/rfc/rfc2616.txt
Hypertext Transfer Protocol -- HTTP/1.1
http://www.ietf.org/rfc/rfc1866.txt
Hypertext Markup Language - 2.0
http://www.w3.org/TR/REC-html32
HTML 3.2 Reference Specification
http://www.w3.org/TR/html401/
HTML 4.01 Specification
http://www.w3.org/TR/xhtml1/
XHTML ™ 1.0 The Extensible HyperText Markup Language
(Second Edition)
http://www.w3.org/TR/xhtml-basic/
XHTML ™ Basic
http://www.w3.org/TR/xhtml11/
XHTML ™ 1.1 - Module-based XHTML
```

In the following description, reference will be made to URLs, web addresses and so forth. It will of course be understood that, although a URL is almost always entered or referenced as an alphanumeric string (e.g. "http://www.ietf.org/", referring to the addresses above), the internet in fact operates on the basis of Internet Protocol (IP) addresses which are 32 bit numbers that may be represented as a series of twelve numbers separated by periods, such as 101.114.186.000. Thus, a preliminary step, when a user requests a web page, is usually for the browser software 110 to access a remote domain name server (DNS) which resolves the textual web address (a fully-qualified domain name, or FQDN) entered by the user into its IP address. This IP address is then returned by the DNS to the browser which then sends the request for a particular page to the resolved IP address. One or more web resources may be present at the resolved IP address, for example two web servers for unrelated web sites may both be accessible at the same IP address. The textual form of the FQDN (rather than the IP address which is the resolved form) is used by the web server to select a web site; the rest of the URL (the path part or resource specifier) selects a particular page on that site.

Errors in a web page (or URL) as requested by a web browser that cause the web page to be unavailable to the web browser may be in the domain name and/or in a particular web page specified as residing at the domain name.

Referring still to FIG. 1, suppose the user wishes to view a web page on a remote web server 120. The user types the URL of the web page into the web browser software 110 using the keyboard 103. A hypothetical example of such an internet address is:

http://www.chemical_elements.com/hydrogen/atomic_weight.html where "www.chemical_elements.com" specifies the FQDN address of the web server 120 and where "/hydrogen/atomic_weight.html" specifies a web page that is sought on the web server 120.

As a first step, the web browser software 110 sends an HTTP request 130 to the web server 120 (having initially obtained a resolution of the URL into an IP address as defined above). The web server 120 receives the request for the information (the page) sought, but (in this hypothetical example), finds that the requested page is not available. The web server 120 therefore returns an HTTP status code to the web browser software 110 at the user's PC 101, indicating that the requested web page could not be found. An example of an HTTP status code is "404 Not Found". This status code indicates that the requested web page could not be found; there are alternative HTTP status codes which can be used by the web server 120 to indicate whether the requested web page is temporarily or permanently unavailable on the web server 120.

In accordance with an embodiment of the present invention, rather than displaying this 404 error, a plug-in 111 is instead employed to enhance the functionality of the browser in handling such errors, as will be explained below. Plug-ins such as plug-in 111 are pieces of software that augment the web browser software 110. A browser helper object (BHO) could be used as a plug-in for Microsoft® Internet Explorer®.

Without the plug-in 111, the web browser software 110 would simply display an indication that the requested page could not be found on the server, together with the HTTP status code (e.g., "404 Not Found"). The plug-in 111 modifies the behaviour of the web browser software 110 when an appropriate HTTP status code such as "404 Not Found" is received. Specifically, the plug-in 111 detects the HTTP status code and prevents the web browser software 110 from displaying the normal "404 Not Found" error display.

Instead, the plug-in 111 causes the web browser software 110 to send an HTTP request 132 to a helper web server 140 which is typically remote from both the web server 120 hosting the URL which could not be located, and the user's PC 101. The HTTP request 132 includes the URL of the web page that was not available on the web server 120.

The helper web server 140 operates in conjunction with the plug-in 111 to provide the user with an alternative, improved display of information, as set out below.

The helper web server 140 includes analysis software 141 that analyses the address contained in the HTTP request 132 in order to determine the context of the page that was not available on the web server 120. Here, the analysis software 141 analyses the web address of the web server 120 and also analyses the address of the web page that could not be found on the web server 120, and determines that the context of the missing web page involves the keywords: "chemical", "elements", "hydrogen", "atomic" and "weight". Software and algorithms for determining the context of information are, as such, well known in the art. For example, some known algorithms assess the number of links to a web page, and the sources of those links, in order to determine the context of the information; some others employ techniques based on word stemming. The details of the algorithm(s) used by the analysis software employed here do not form part of the present invention and will not be discussed further.

The helper web server 140 also includes index database software 142 which is used to identify web pages on other web servers (i.e. on web servers other than the web server 120 and the helper web server 140) that could be relevant to the context of the missing web page. The index database software 142 comprises a database that lists potentially relevant web sites for each term in the database.

For example, for the word "chemical", the index database software 142 may have several entries that are related to the field of chemistry. For the word "elements", the index database software 142 may have some entries that are relevant to chemistry and some that are not relevant to chemistry. An example of an entry in the index database software 142 for the word "element" that is not relevant to the field of chemistry would be a web page entitled "elements of modern dance" which, in this example, would be related to choreography and not to chemistry. The index database software 142 uses the key words extracted by the analysis software 141 to produce a list of potentially relevant web pages. The list produced may be ordered/ranked by the anticipated relevance of the web pages to the key words. For example, a web page having the key words "atomic", "weight" and "hydrogen" may be ranked higher than a web page having the key words "chemical", "elements", "hydrogen" and "weight" even though the latter web page has four of the key words rather than three of the key words. The details of the ranking algorithms employed here do not form a part of the present invention and will not be described further. Ranking algorithms are, as such, known in the art, and the details of the ranking algorithm(s) employed here do not form part of the present invention and will not be discussed further.

The ranked list of potentially relevant websites produced by the index database software 142 is then passed to web page creation software 143. The web page creation software 143 also forms part of the helper web server 140. The web page creation software 143 dynamically generates a web page that is sent as an HTTP response 133 to the user's PC 101. The web browser software 110 then interprets the HTTP response 133 and displays the web page on the display 104 of the user's PC 101.

By "dynamic", it is meant that the web page creation software 143 does not retrieve a pre-defined web page, but that the web page creation software 143 generates a web page on the basis of the context that was determined by the analysis software 141 and by the links as determined and ranked by the index database software 142. Thus, the web page that is generated by the web page creation software 143 will usually be particular to a given context. Each time that the user attempts to view a web page that does not exist on the web server 120, or does not exist on some other web server, the plug-in 111 is able to detect the receipt of the HTTP "404 Not Found" or similar response from the web server. The plug-in 111 then causes the user's PC 101 to contact the helper web server 140 so that a dynamically generated web page, that is relevant to the context of the unavailable page, is displayed on the screen 104 of the user's PC 101.

FIG. 5 shows an example of a web page 500 that is displayed on the screen 104 of the user's PC 101 once the HTTP response 133 has been received by the user's PC 101 and interpreted by the web browser software 110. As shown, the web page 500 contains a message field 501, which provides the user with an informative message, and also contains a back button 502 and a link field 503. In this case, the message is:

"Sorry, couldn't find the page you were looking for. You can either press the 'Back button' or click on a relevant link".

The back button 502 allows the user to move back through his history of previously viewed web pages.

The link field 503 provides the user with a ranked list of suggested links that may be of relevance to the context of the user. Here, the link field 503 contains two links, link 503.1 and link 503.2. For each of the two links, the title of the web page pointed to by the respective links is given, followed by the respective key words that are present on the respective web page followed by the internet address of the respective web page. As shown, the link 503.1 is a web page that is relevant to the properties of hydrogen. The web address gives the web server and the address of the web page on the web server. Link 503.2 is concerned with a choreography web page. Link 503.2 is displayed below link 503.1 as, according to the ranking formed by the index database software 142, link 503.2 is considered less likely to be relevant to the user than the link 503.1.

Assuming that the user regards the link 503.1 as being relevant, and proceeds to select the link 503.1 by clicking on it using the mouse 102, the link 503.1 specifies the internet address of the web page that the user wishes to view. Here, the page may be found on a linked server 150.

The linked server 150 in this embodiment is not typically a part of the web server 120 or the helper web server 140; instead, the database of the index database software 142, held on the helper server 140, contains an internet link to the linked server 150.

Thus, the link 503.1 specifies the internet address of linked server 150 and also specifies the location on the linked server 150 where the page may be found. When the user clicks on the link 503.1, the web browser software 110 sends an HTTP request 134 to the linked server 150. The linked server 150 returns an HTTP response 135 which defines the required web page. The web browser software 110 interprets the web page defined by the HTTP response 135 and displays the requested web page on the screen 104 of the user's PC 101.

Thus, the plug-in 111 and the helper web server 140 can improve the web browsing experience of a user by, instead of merely presenting the user with a HTTP "404 Not Found" message, presenting the user with a list of potentially relevant links for the user to click on.

Second Embodiment

Figure 2:
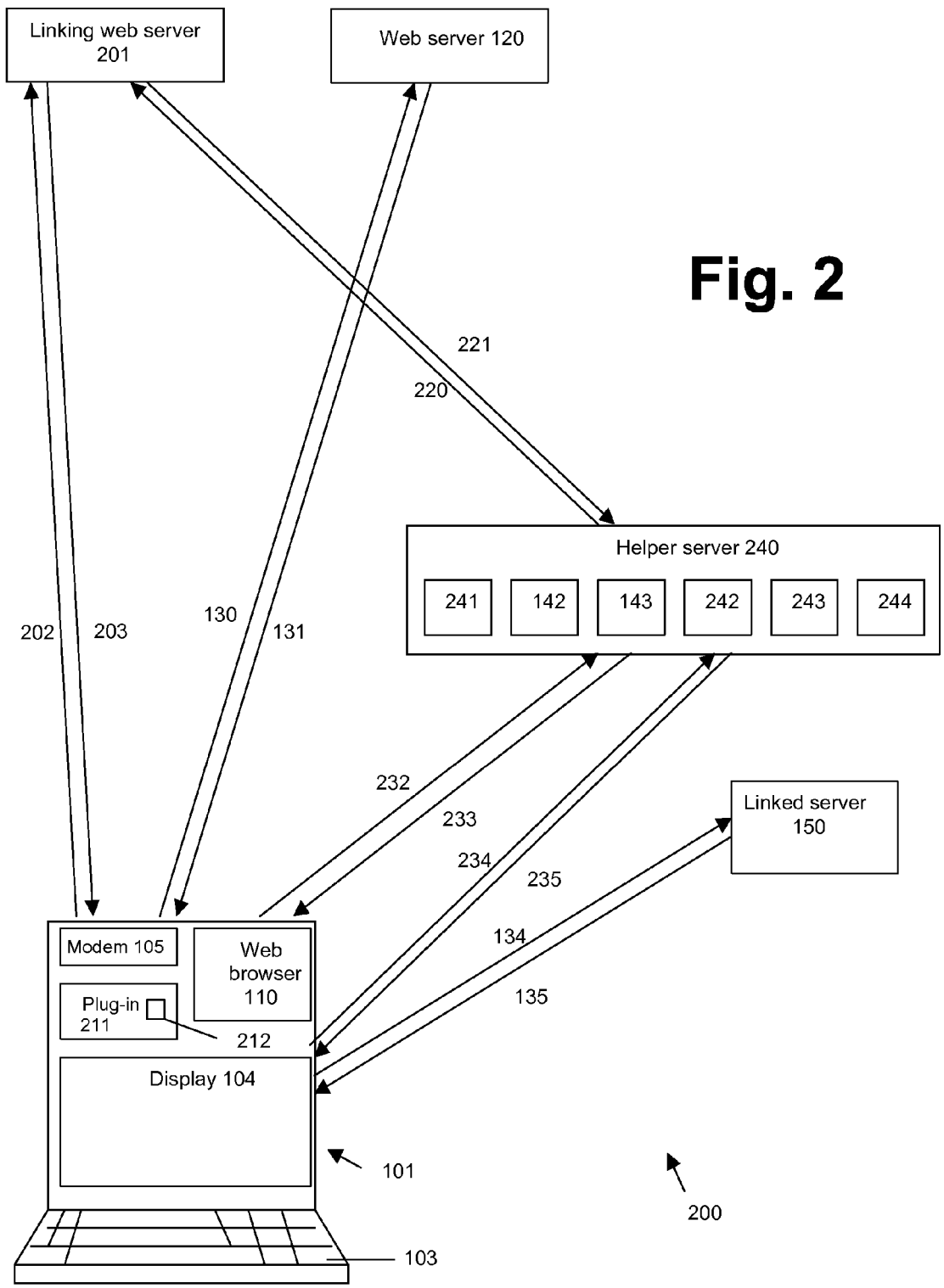
FIG. 2 illustrates a computer system arranged in accordance with a second embodiment of the invention.

FIG. 2 shows a system 200 according to a second embodiment of the invention. Many of the components of the system 200 are identical to components of the system 100. The parts in common have therefore retained the same reference numerals that were used in FIG. 1.

Whereas the system 100 catered for a situation where the user entered the address of a non-existent web page, system 200 caters for the situation where a user clicks on a link provided by a "linking web server" 201 which points to a link that does not exist on the web server 120. The system 200 is also able to collect information that may be used to improve the relevance of the links presented to the user, or for other purposes.

As a first step in this second embodiment, the user types the internet address (URL) of a website on the linking web server 201 into the web browser software 110 via the keyboard 103. The web browser software 110 sends an HTTP request 202 to the linking web server 201. In this example, the requested page on the linking web server 201 is found, so the linking web server 201 responds with an HTTP response 203. The web browser software 110 interprets the web page defined by the HTTP response 203 and displays the web page on the display 104. The displayed web page includes one or more faulty links. By faulty links, it is meant that the link is either incorrect or that the link points to a page that is no longer available.

In a next step, the user clicks on one of the faulty links (which, of course, he does not know to be faulty as a rule). The web browser software 110 sends an HTTP request 130 to the remote web server 120 where the website of the missing page or broken link is held. The web server 120 determines that the requested page is not available and returns an HTTP "404 Not Found" response 131 to the web browser software 110.

The system 200 has a plug-in 211 which is similar to the plug-in 111 but includes a participant ID 212. The participant ID 212 is a piece of data that identifies the organisation that supplied the plug-in 211 to the user. The plug-in 211 is arranged to be able to transmit the participant ID 212 to a helper server 240.

The helper server 240 is similar to the helper server 140 of the system 100 but includes participant monitoring software 242 for analysing the various participant IDs 212 of different users. Although for clarity only a single user's PC 101 is shown in system 200, multiple users, using respective PCs, can simultaneously use web browser software 110 at their respective PCs together with respective plug-ins 211. The plug-ins 211 are substantially identical but are provided with different participant IDs 212, depending on whichever organisation supplied a plug-in 211 to a user.

Returning to FIG. 2, when the plug-in 211 detects that an HTTP "404 Not Found" response 131 has been received from the web server 120, the plug-in 211 causes the web browser software 110 to send an HTTP request 232 to the helper web server 240. The HTTP request 232 is similar to the HTTP request 132 of system 100 but includes the participant ID 212.

For the system 200, an example of the HTTP request 232, is as follows:
GET http://internet_address_of_helper_web_server_240/
search.asp?participantID=123456&referrer=web_
page_address_of_page_on_linking_server_201&
error=404&missing_page=web_page_address_of_
missing_page where:
internet_address_of_helper_web_server_240 is the internet address of the helper server 240;
participant ID is the participant ID of the plug-in 211;
web_page_address_of_page_on_linking_server_201 is the address of the web page on the linking web server 201 that contains a link to the page that is not present on the web server 120;
404 is the status code of the HTTP response 131; and
web_page_address_of_missing_page is the address of the page not present on the web server 120 that was pointed to by the page on the linking server 201.

The helper web server 240 uses the HTTP request 232 to deduce the context of the missing web page. The participant monitoring software 242 that forms part of the helper server 240 records the participant ID 212 of the plug-in 211 that caused the HTTP request 232 to be sent. Here, the participant ID 212 has a value of "123456".

The helper server 240 comprises analysis software 241 that is similar to the analysis software 141 of the system 100. However, the analysis software 241 obtains, by virtue of the extra information provided in the HTTP request 232 (compared to the HTTP request 132), enhanced information regarding the context of the web page that the user attempted to view. The analysis software 241 uses the "referrer" information in the HTTP request 232 to send an HTTP request 220 to the linking web server 201. The HTTP request 220 requests the web page, from the web server 201, that contained the erroneous link to a page on the web server 120. The linking web server 201 responds with an HTTP response 221. The HTTP response 221 includes information which defines the appearance and content of the web page that was displayed on the display 104 of the user's PC 101. The analysis software 241 does not actually display the web page defined by the information in the context HTTP response 221 but analyses the information to determine keywords in the vicinity of the link.

FIG. 6 shows an example of a web page 600 as it could be displayed (the analysis software would not usually display the web page 600) on the display 104 of the user's PC 101.

The analysis software 241 analyses the web page 600 to determine the location of the link that pointed to the non-existent web page on the web server 120. The link is denoted by the reference numeral 601. As shown, the words in the vicinity of the link 601 contains various keywords that are relevant to the context of the link 601. The analysis software 241 analyses these keywords to determine appropriate key words. Various methods for analysing and indexing key words on web pages are known in the art. Here, the analysis software 241 determines key words 602 that are to be used by the index database software 142. The analysis software 241 also analyses the web address of the web page 600 for relevant key words. The results of the analysis are passed by the analysis software 241 to the index database software 142. The index database software 142 then produces a list of one or more links that are anticipated to be relevant to the user.

In this embodiment, system 200 uses the participant ID 212 to obtain further context information. The participant monitoring software 242 comprises a database that relates participant IDs to whichever organisation supplied the plug-in 211 to the user. In this hypothetical example, the participant ID 212 has a value of "123456" which indicates that the plug-in 211 was supplied to the user by a hypothetical organisation called "Industrial Chemistry Organisation". It is likely that the user has some affiliation with the hypothetical society of "Industrial Chemistry Organisation" and this provides additional context information, namely that the expected context is the field of chemistry. In this embodiment, the participant monitoring software 242 passes to the index database software 142 information indicating the expected context.

The list of potentially relevant websites that is created by the index database software 142 is passed to the web page creation software 143 which then sends an HTTP response 233 to the web browser software 110. The HTTP response 233 includes information defining a web page; the web browser software 110 interprets the information and displays the web page on the display 104. The displayed web page is similar to that shown in FIG. 5 but is more focused towards what is deemed by the analysis software 241 and the index database software 142 to be the likely context of the user. The HTTP response 233 is similar to the HTTP response 133 of the system 100 but, whereas the web page defined by the HTTP response 133 included a link that pointed directly to the linked server 150, the web page defined by the HTTP response 233 has links to the helper server 240. Although the links point to the helper server 240 rather than the linked server 150, the links contain information which allows the helper server 240 to direct the web browser software 110 to the linked server 150. The way in which the helper server 240 processes these links will now be discussed.

If the user clicks on one of the links, the web browser software 110 sends an HTTP request 234 to the helper server 240. For the system 200, an example of the HTTP request 234 is as follows:
GET http://internet_address_of_helper_web_server_240/
tracker.asp?participantID=123456&link_address=
web_page_address_of_web_page_on_linked_server_
150

The HTTP request 234 specifies the web address of the helper server 240 and also contains, as parameters, the web address of the linked server 150 and the participant ID 212. The helper server 240 includes tracker software 243. Here, the tracker software 243 determines that the participant ID is "123456".

The tracker software 243 maintains a count of the number of times that an HTTP request 234 is received for each participant ID 212. Thus, each time that the user of the PC 101 clicks on a link received from the helper server 240, the tracker software 243 will increment by 1 a tally for the participant ID "123456". When other users click on such links, the respective tally for the other participant IDs will be increased by 1. Thus, the tracker software 243 allows the helper server 240 to determine how many "clicks" are received from each of the organisations that can distribute plug-ins 211.

The helper server 240 also includes re-direction software 244. On receipt of an HTTP request 234, the re-direction software 244 extracts the parameter specifying the web address of a page on a linked server 150. The re-direction software 244 then sends an HTTP response 235 to the web browser software 110. The HTTP response 235 includes an HTTP re-direction status code (e.g. "302 Moved Temporarily", which is always followed by a "Location:" header field) which indicates to the web browser software 110 that the web browser software 110 should look for the web page (that is, the web page requested by the HTTP request 234) at another location. The other location is specified by, in this example, the "Location:" header field of the HTTP response 235.

The web browser software 110, on receipt of the HTTP response 235, sends an HTTP request 134 to the linked server 150. The linked server 150 responds with an HTTP response 135 and causes a web page to be displayed on the display 104 of the user's PC 101.

An advantage of the inclusion in the HTTP request 232 of the participant ID 212 is that the participant monitoring software 242 can improve the context that is used by the index database software 142. In alternative embodiments of the system 200, the participant ID 212 is omitted from the HTTP request 232 and the participant monitoring software 242 is dispensed with. In still another embodiment, the participant monitoring software 242 is used, in conjunction with the analysis software 241 and the index database software 142, to either enhance the ranking of "favoured" linked servers 150 or is used to prevent links to one or more "non-favoured" linked servers 150 from being presented to the user.

In alternative embodiments of the system 200, the plug-in 211 is arranged so that the participant ID 212 is not included in the HTTP request 234, in which case the tracker software 243 of the helper server 240 could be dispensed with. However, the inclusion of the participant ID 212 in the HTTP request 234 and retention of the tracker software 243 is preferred. The use of the participant ID 212 tracker software 243 allows the helper server 240 to count how many links have been provided to a particular linked server 150, and also to determine the participant ID 212 of the plug-in 211 that was used to access a particular linked server 150. This allows the owners of the helper server 240 to obtain financial revenue from owners of linked servers 150 and to share the revenue with the organisations that provide the plug-in 211 to users.

FIG. 2 shows only a single linked server 150. In a typical implementation of the system 200, it will be understood that there are many linked servers 150. For a server 150 to be "linked" to the helper server 240, it is necessary that the index database software 142 contains information that specifies the web address of a web page on a particular linked server 150. Of course, as well as having links to a plurality of linked servers 150, the index database software 142 may have links to a plurality of web pages that are retrievable from a particular linked server 150. The links may also include links to other web pages, that can be retrieved without a "404 Not Found" error, on the web server 120.

Suppose that the owners of the helper server 240 have concluded agreements with the respective owners of various linked servers 150 so that, for each "click-through" to a linked server 150 that results from the use of a plug-in 211 and the helper server 240, the owner of the respective linked server 150 provides a payment to the owner of the helper server 240. Suppose also that the owners of the helper server 240 have concluded agreements with one or more organisations that are prepared to distribute plug-ins 211, where each of the organisations is allocated a respective participant ID 212 (e.g. "123456" or "111222") to distinguish the plug-ins 211. The tracker software 243 and the re-direction software 244 each counts how many click-throughs have been passed to each linked server 150. As an example, suppose company A owns a first linked server 150 that has received 20 click-throughs, and that company B owns a second linked server 150 that has received 10 click-throughs. Both company A and company B provide the owners of the helper server 240 with financial remuneration based on the number of click-throughs as recorded by the tracker software 243 and the re-direction software 244. Thus, the owners of the helper server 240 are remunerated for a total of 30 click-throughs. Suppose also that a first organisation C has provided some users with a plug-in 211 having a participant ID 212 of "123456", and that a second organisation D has provided other users with a plug-in 211 having a participant ID 212 of "111222". The owners of the helper server 240 can provide the organisations C and D with a portion of the remuneration received from the owners A and B, in proportion to the number of click-throughs resulting from (i) the plug-in 211 having the participant ID of "123456", and (ii) from the plug-in 211 having the participant ID 212 of "111222". Thus, the organisations C and D are encouraged to distribute plug-ins 211 with the respective participant IDs 212 to users.

In alternative embodiments of the system 200, it is not necessary to count the number of click-throughs to the one or more linked servers 150. In such embodiments, the participant ID 212 is not included in the HTTP request 234; similarly, the tracker software 243 may be dispensed with.

Third Embodiment

Figure 3:
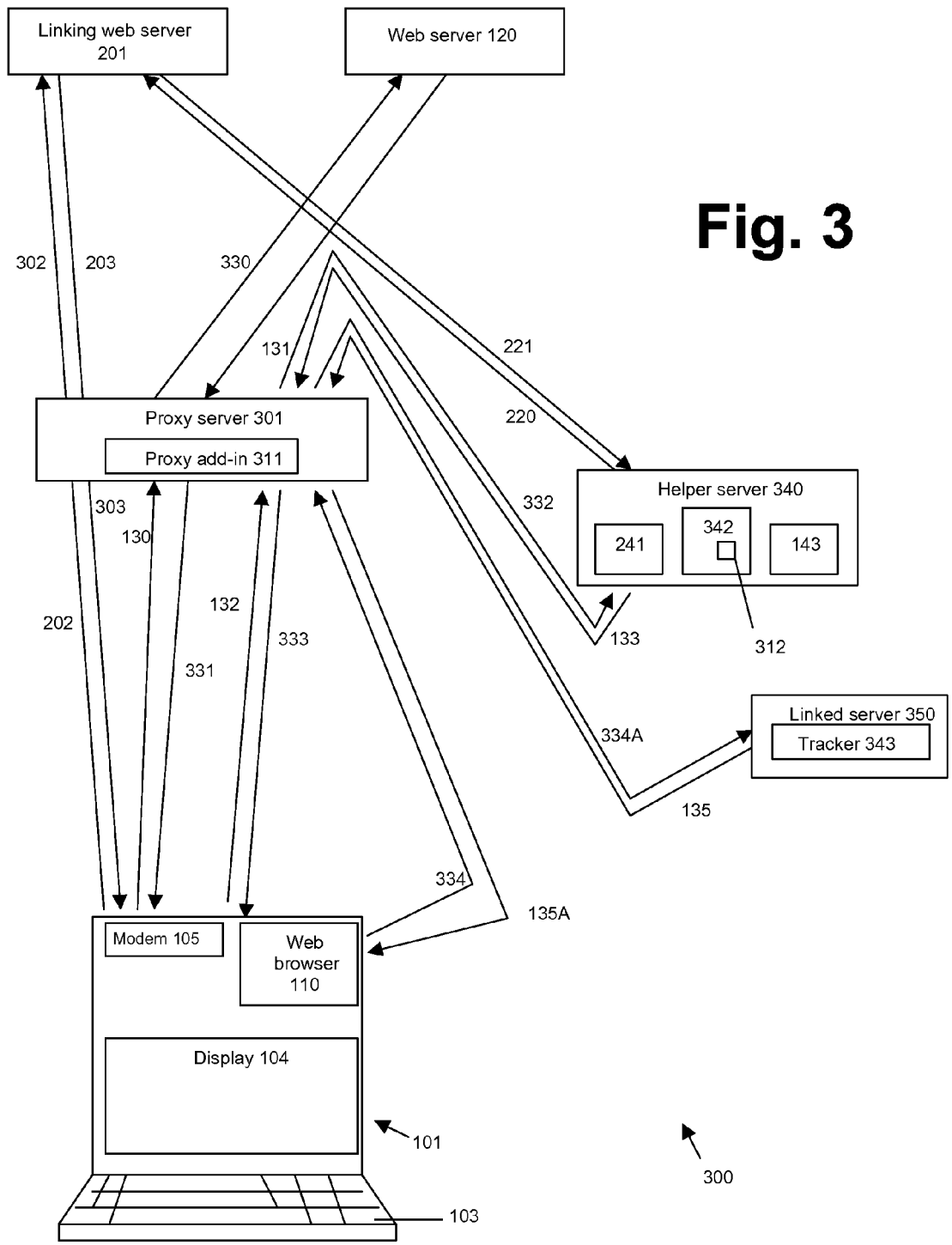
FIG. 3 illustrates a computer system arranged in accordance with a third embodiment of the invention.

FIG. 3 shows a system 300 according to a third embodiment of the invention. The system 300 is in some ways similar to the system 200 and like reference numerals are again employed for like components. However, the system 300 includes a proxy web server 301. Proxy servers are used by some internet service providers (ISPs) as gateways between individual subscribers of the ISP (e.g. home users) and the internet. Proxy servers are also used by some businesses as an interface between the PCs used by their staff, and the internet. Proxy servers can provide increased security by incorporating a virus scanner and increased performance by caching information. All web (HTTP) communication between the user's PC 101 and the internet is through the proxy server 301 which receives HTTP requests from the user's PC 101 and then relays them to other web servers on the internet. HTTP responses from the other web servers on the internet are received by the proxy server 301 which then relays them to the user's PC 101.

Another difference between the system 300 and the system 200 is that the helper web server 340 of the system 300 does not count the number of click-throughs to linked servers 150. Instead, modified index database software 342 is used instead of the index database software 142. As well as storing the web addresses of web pages on linked servers 150, the index database software 342 also stores "linked IDs" 312 which allow linked servers 350 to count how many click-throughs they have received from the helper server 340. The linked servers 350 are similar to the linked servers 150 but include tracker software 343 for counting the number of click-throughs received.

In the embodiment illustrated in FIG. 3, the user of the PC 101 either types in a web address into the web browser software 110 or clicks on a link to the linking web server 201. Here, the HTTP request 202 is intercepted by the proxy server 301 which modifies the header of the HTTP request 202 and sends a new HTTP request 302 to the linking web server 201. The linking web server 201 responds with a HTTP response 203 which is intercepted by the proxy server 301. The proxy server 301 modifies the header of the HTTP response 203 and sends a HTTP response 303 back to the web browser software 110. A similar sequence of events occurs for HTTP requests 130 and 330. When the HTTP "404 Not Found" response 131 is received by the proxy server 301 from the linked web server 120, a "proxy add-in" 311 modifies the behaviour of the proxy server 301.

The proxy add-in 311 is a piece of software (in this embodiment) or hardware that modifies the behaviour of the proxy server 301 when an HTTP "404 Not Found" or similar status code is received. Thus, the proxy add-in 311 performs a function that is in some ways equivalent to the plug-in 111 and the plug-in 211 of the systems 100 and 200. The proxy add-in 311 is typically supplied to the owner of the proxy server 301 by the owner of the helper server 340. Whenever the proxy server 301 receives an HTTP "404 Not Found" response 131 from a web server 120, the proxy add-in 311 causes the proxy server 301 to generate a HTTP re-direct response 331 and send it to the web browser software 110. The HTTP re-direct response 331 includes the web address of the page on the linking web server 201 that has an erroneous link to a page on the web server 120, and the web address of the missing page on the web server 120.

The web browser software 110, on receipt of the HTTP re-direct response 331, sends an HTTP request 132 to the helper web server 340 via the proxy server 301. The HTTP request 132 is received by the helper web server 340 as HTTP request 332. The HTTP requests 132 and 332 both include as parameters the web address of the page on the linking web server 201 that contained an erroneous link to a page on the linked web server 120, together with the address of the missing page on the web server 120.

The helper web server 340 extracts from the HTTP request 332 the web address of the page on the linking web server 201. As for the system 200, the helper web server 340 sends an HTTP request 220 to the linking web server 201 and receives an HTTP response 221. As for the system 200, the analysis software 241 determines the context of the missing web page and passes context information to index database software 342.

The index database software 342 includes a database of web pages on linked servers 350. The index database software 342 also includes one or more linked IDs 312. The linked IDs 312 are provided to the owner of the helper web server 340 by the respective owner(s) of the linked servers 350. Typically, each owner of a linked server 350 supplies the owner of the helper server 340 with a linked ID 312 that is unique to the owner of the helper server 340. The one or more linked IDs 312 allow the owner(s) of linked servers 350 to distinguish click-throughs from the helper server 340 with click-throughs from other web servers (not shown). The linked server 350 counts the number of linked IDs 312 that it receives. Suppose that the owner of the helper web server 340 has been allocated a linked ID 312 having the value of "123321". Each time that the linked server 350 receives a linked ID 312 having a value of "123321", a counter (not shown) is incremented. Thus, this counter allows the owner of the linked server 350 to determine how many click-throughs have originated from the helper web server 340. In return, the owner of the linked server 350 remunerates the owner of the helper web server 340.

A more detailed description of the system 300 will now be presented.

As before, the web page creation software 143 generates a web page and this web page is sent as an HTTP response 133 to the user's PC 101 via the proxy server 301. The HTTP response 133 is received by the user's PC 101 as HTTP response 333. As a result, a web page is displayed on the display 104 of the user's PC 101. The web page includes one or more links. Each of the one or more links points to a linked server 350. Each of the links also includes, as a parameter, the linked ID 312 that has been allocated by the owner of the respective linked server 350 to the owner of the helper web server 340.

If the user clicks on one of the links, then an HTTP request 334 is sent from the user's PC 101 via the proxy server 301, and is received by the linked server 350 as an HTTP request 334A. The HTTP request 334 is similar to the HTTP request 134 of the systems 100 and 200 but includes, as a parameter, the value of the linked ID 312, i.e. "123321".

The linked server 350 includes tracker software 343 that analyses the linked ID parameters that are contained in HTTP requests. Each time that the linked server 350 receives an HTTP request with a linked ID of "123321", the tracker software 343 increments a counter, indicating that a click-through has been received under the auspices of the helper web server 340. In response to the HTTP request 334A, the linked web server 350 sends an HTTP response 135 via the proxy server 301, to the user's PC 101, where it is received as an HTTP response 135A.

The proxy add-in 311 of the system 300 does not store a participant ID 212. In an alternative embodiment of the system 300, the proxy add-in 311 stores a participant ID 212 which is conveyed to the helper server 340. This allows the helper server 340 to distinguish between proxy servers 301 owned by different organisations. By counting, for each value, e.g. "123456", the number of participant IDs 212 received, the owner of the helper server 340 can remunerate the owners of the proxy servers 301 in proportion with the number of click-throughs. Of course, this alternative embodiment cannot track whether or not an HTTP request 332 actually resulted in a click-through. In an alternative embodiment, the proxy add-in 311 is modified so that HTTP requests 334 are monitored, thus allowing the modified proxy add-in 311 to determine the remuneration appropriate to each of the respective owners of the participating proxy servers 301.

Fourth Embodiment

Figure 4:
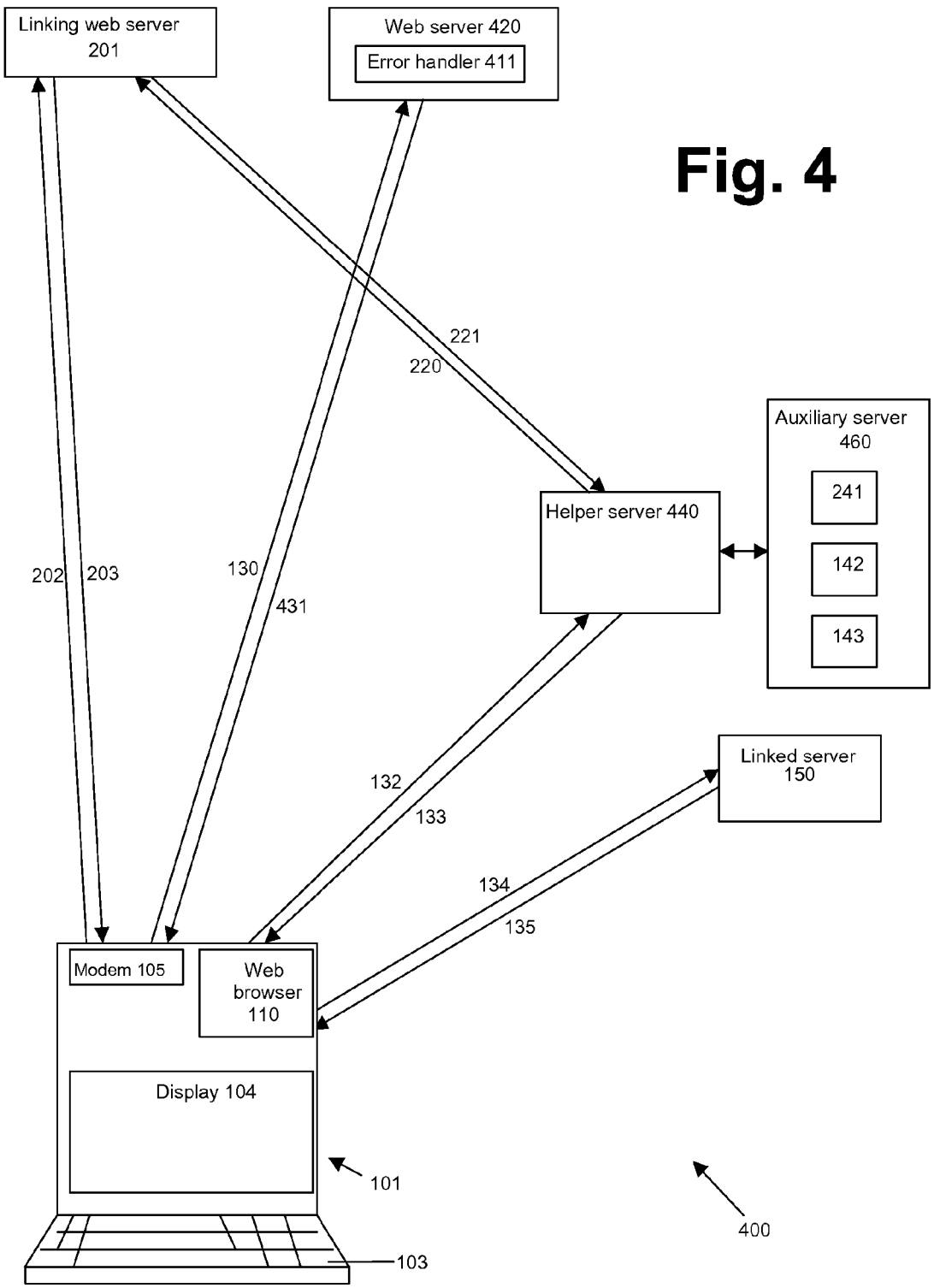
FIG. 4 illustrates a computer system arranged in accordance with a fourth embodiment of the invention.

FIG. 4 shows a system 400 according to a fourth embodiment of the invention.

Whereas the systems 100, 200, 300 showed a web server 120, the system 400 has a web server 420. The web server 420 is similar to the web server 120 but includes an error handler 411. The error handler 411 modifies the behaviour of the web server 420, compared to the behaviour of the web server 120, when a requested web page cannot be retrieved from the web server 420. The error handler 411 modifies the behaviour of the web server 420 so that rather than returning an HTTP status code such as "404 Not Found", the web server 420 returns an HTTP response 431 which includes an HTTP re-direction status code (e.g. "302 Moved Temporarily", together with a "Location:http://internet_address_of_helper_server_240/search.asp?referrer=web_page_address_of_page_on_linking_server_201&error=404&missing_page=web_page_address_of_missing_page" field). The HTTP response 431 causes the web browser software 110 to send an HTTP request 132 to a helper server 440.

The helper server 440 is in communication with an auxiliary server 460. The auxiliary server 460 includes analysis software 241, index database software 142 and web page creation software 143. Thus although the helper server 440 differs from the helper servers 140, 240, 340, it is able to provide, in effect, similar functionality in conjunction with the auxiliary server 460. When the auxiliary server 460 requires access to a web page then the helper server 440 acts as a proxy server for the auxiliary server 460.

The helper server 440 sends an HTTP request 220 to the linking web server 201 which responds with an HTTP response 221 to the helper server 440. The web page creation software 143 of the auxiliary server 460 then generates a web page and sends, via the helper server 440, an HTTP response 133 to the web browser software 110. If the user clicks on a link then an HTTP request 134 is sent to the linked server 150 which replies with an HTTP response 135, thereby causing a web page from the linked server 150 to be displayed on the display 104 of the user's 101.

In alternative embodiments of the system 400, the error handler 411 is arranged to include a participant ID 212 which is included in the HTTP response 431 and thus conveyed to the helper server 440. In another embodiment of the system 400, the index database software 142 of the auxiliary server 460 is replaced with the index database software 342 which includes linked IDs 312. In yet further embodiments, the helper server 440 further includes tracker software 243 and re-direction software 244.

Fifth Embodiment

In the systems 100-400, the plug-in 111, 211, proxy add-in 311 or error handler 411 detected that a signal (such as the HTTP status code "404 Not Found") that indicated that a web page requested by the user could not be displayed on the web browser 110/display 104 of the user's PC 101. In some situations, an error may occur without an HTTP status code being generated.

In the fifth embodiment (not shown), the errors in such situations are detected by the plug-in 111, 211, proxy add-in 311 or error handler 411, as appropriate, and used to activate the analysis software 141, the index database software 142 and the web page creation software 143. Those skilled in the art will readily appreciate the modifications required to the plug-in 111, 211, proxy add-in 311 or error handler 411.

The following five examples are examples of situations where no HTTP status code will be generated by the web server 120:

1. Non-existent Domain Name

In the event that the DNS lookup done by the web browser 110 for request 130 in the systems 100, 200 or that done by the proxy server 301 for HTTP request 330 in the system 300 fails to convert a textual Internet address (e.g. 'www.some_non_existant_domain.com') to a numeric Internet Protocol address, the plug-in 111, 211 or proxy add-in 311 will receive an error code from the DNS server and behaves as if an HTTP 'Host not found' error has occurred.

Suppose that there is a standard web proxy server (i.e. a proxy server that does not include the proxy add-in 311) between the user's PC 101 and the web server 120 in the systems 100, 200 or between the proxy server 301 and the web server 120 in the system 300, then that standard proxy server will convert its received DNS error message to an HTTP error message and send that back to the web browser 110 or proxy server 301. The plug-in 111, 211 or proxy add-in 311 will then be informed of the HTTP status code as usual.

2. No Server at Given IP Address

In the event that the IP address in the URL or the IP address resolved from the FQDN in the URL is not currently assigned to any machine on the Internet, the web browser 110 or proxy server will fail to establish a connection to the non-existent web server 120.

2.1. The web browser 110 or proxy server 301 (or standard proxy server) will timeout if a connection is not established within a certain period (typically a few seconds). The plug-in 111, 211 or add-in 311 will receive notification of this and can again proceed as if it had received an HTTP 'Host not found'. (The standard proxy will convert the timeout to an HTTP status code and send this to the web browser 110 or proxy server 301 and so the plug-in 111, 211 or proxy add-in 311 can behave as previously discussed.)

2.2. Alternatively, a router closer to the sub-network where the web server 120 should be may already have information that the web server 120 does not exist. It will send an ICMP (Internet Control Message Protocol) 'Host unreachable' message back. The plug-in or add-in will be informed as above and can proceed as for any other error. (Again, a standard proxy will typically convert the ICMP error to an HTTP status code that is received by the web browser 110.)

3. No Route to Server

In the event that there is a problem preventing datagrams reaching web server 120 from the user's PC 101 or the proxy server 301 (or an intervening standard web proxy), the same will occur as in case 2, except that an intervening router may send ICMP 'Network unreachable' in case 2.2.

4. No Route from Server

In the event that there is a problem preventing datagrams returning from web server 120, case 2.1 will always apply.

5. Server is Not a Web Server

In the event that the server 120 is connected but that it is not running web server software on the standard HTTP port number (TCP port 80) or on the port number specified in the URL, it may ignore requests completely which would result in case 2.1 or it may return ICMP 'Protocol unreachable' or ICMP 'Port unreachable' which can be handled as in 2.2.

A reference for the five situations referred to above can be found at:

http://www.ietf.org/rfc/rfc0792.txt IETF RFC 792: Internet Control Message Protocol It should be noted for the situation described at 2.1 above that although an HTTP status code is returned to the web browser 110, this HTTP status code is generated by a standard proxy server but is not generated by the web server 120.

Sixth Embodiment

FIG. 7 shows a system 700 according to a sixth embodiment of the invention. The system 700 has many features in common with the system 100 that was described earlier. However, in the system 700 the helper server 140 of the system 100 is replaced by a helper server 740. The helper server 740 is similar to the helper server 140 but is also arranged to communicate with a "who is" server 701 and a "what is" server 702.

The system 700 allows additional information to be obtained about the context of a failed HTTP request 130. As those skilled in the art will appreciate, the system 100 as described above analysed the textual form of the URL of the web server 120 to determine keywords (e.g. "chemical" and "elements"). Although in some situations the analysis of keywords of a URL may provide sufficient context information, in other situations more context information may be required in order to provide a user of the system with links to alternative web pages that are of sufficient relevance.

A hypothetical example will now be presented. For example, suppose that the user types in the web address:
  http://www.elephant.co.uk/this_page_does_not_exist.html In this hypothetical example, the web server 120 returns an HTTP response 131 which includes the HTTP status code "404 Not Found". (Note that this is a hypothetical example, the actual www.elephant.co.uk website does not return a 404 HTTP status code but instead displays a page indicating that the "this_page_does_not_exist.html" page could not be found.) The plug-in 111 then sends an HTTP request 132 (which includes the web address) to analysis software 741 of the helper server 740.

The analysis software 741 is similar to the analysis software 141 but is arranged to attempt to obtain further information regarding the context of the web page that could not be found. For example, a naïve analysis of the context of the web address above for natural language keywords might suggest that the context of the web page is pachyderms (i.e. animals such as elephants having a thick skin).

In this embodiment the analysis software 741 sends the FQDN (i.e. www.elephant.co.uk) as part of an HTTP request 730 to a "whois" server 701. The whois server 701 provides information regarding the person or organisation that has registered the domain name www.elephant.co.uk. An example of a whois server 701 is the whois server at the following web address:
  http://www.samspade.org/t/whois?server=magic As those skilled in the art will appreciate, the whois protocol is defined by the IETF in RFC 3912 (see http://www.ietf.org/rfc/rfc3912.txt which is incorporated by reference). There is no specification for the format of requests to HTTP-based whois servers. Each defines its own. RFC3912 defines the whois protocol which is independent of HTTP. Therefore depending upon the whois server chosen for helper server 740, request/response pair 730/731 may use a custom HTTP-based format as illustrated for SamSpade or they may use the defined whois format from RFC3912.

The analysis software 741 receives an HTTP response 732 from the whois server 701. For this hypothetical example, the HTTP response 732 includes the following information:
Domain Name:
  elephant.co.uk
Registrant:
Admiral Insurance services Limited
  Registrant's Agent:
  NTL Internet Limited [Tag=CABLEOL]
  URL: http://www.ntl.com
  Relevant Dates:
  Last updated: 12-Oct-2004
  Name servers listed in order:

| dns1.ntli.net | 62.253.162.237 |
| dns2.ntli.net | 194.168.4.237 |

WHOIS database last updated at 18:10:00 05-Jul-2005
The context analyser 741 analyses the HTTP response 732 for keywords and on finding the keyword "insurance" (in this case, as part of the name of the registrant), determines that the context of the hypothetical web page that could not be retrieved is in fact insurance and not pachyderms. Thus by using a whois server 701, system 700 can provide an improvement in the relevance of the links in the HTTP response 133.

In the hypothetical example described above, the HTTP response 731 from the whois server 701 included sufficient context information. In other situations, the response from the whois server 701 may contain the name and address of the registered owner of a domain name but might not include keywords such as insurance. For example, the whois response for the domain name www.newscientist.co.uk includes the following information:
Domain Name:
  newscientist.co.uk
Registrant:
  Reed Business Information Ltd
Registrant's Address:
  Quadrant House
  The Quadrant
  Sutton
  Surrey
  SM2 5AS
  GB Although the registrant of the domain name is given, the name of the registrant may not always provide sufficient context information. Here, the name of the registrant is given as "Reed Business Information Ltd" but this does not sufficiently indicate the context of the registrant. In such circumstances, the analysis software 741 extracts, for example, the name of the registrant and sends an HTTP request 732 to the what_is server 702.

The what_is server 702 responds with an HTTP response 733 that includes information regarding the context of the registrant. For example, in the United Kingdom the following website:
  www.192.com
may be used to obtain context information regarding the registrant. For the registrant "Reed Business Information Ltd" the HTTP response 733 includes the keywords "newspaper and magazine publishers". The analysis software 741 uses the keywords as context information. Thus in this embodiment, by concatenating a whois server 701 and a what_is server 702, system 700 can provide an improvement in the relevance of the links in the HTTP response 133.

As those skilled in the art will appreciate, the system 700 may also use the address of the registrant as part of the context information or as part of the query to the what_is server 702. Instead of using www.192.com, the system 700 may be arranged to interrogate an on-line database such as that of Companies House. In the UK, Companies House is an official register which provides details of registered companies.

Those skilled in the art will also appreciate that the system 700 may be modified, for example to operate in conjunction with the systems 200, 300, 400. Those skilled in the art will also appreciate that the system 700 may be modified. For example, the analysis software 741 may be modified so that instead of, or in addition to, seeking context information from a whois server 701 or a what_is server 702, the context analysis software 741 may perform a context analysis on some other information resource. For example, the analysis software 741 may be arranged to send an HTTP request to the home page of a website for which a requested page is unavailable (i.e. in the event that the page http://www.elephant-.co.uk/this_page_does_not_exist.html is unavailable, the analysis software 741 requests the home page from the web site www.elephant.co.uk and performs a context analysis on the home page). As those skilled in the art will appreciate, there are a variety of other on-line resources on which the analysis software 741 may perform a context analysis. Some of these on-line resources are of greater use in obtaining context information (that is, context information regarding a web page that could not be sent to a user's PC 101) than other on-line resources. Those skilled in the art may determine which on-line resources provide useful information. For example, a web page chosen at random is unlikely to provide useful context information. Conversely, on-line databases, the home page of a web site or a referring web page (i.e. a web page with a defective link) are likely to provide useful context information.

Seventh Embodiment

Figure 8:
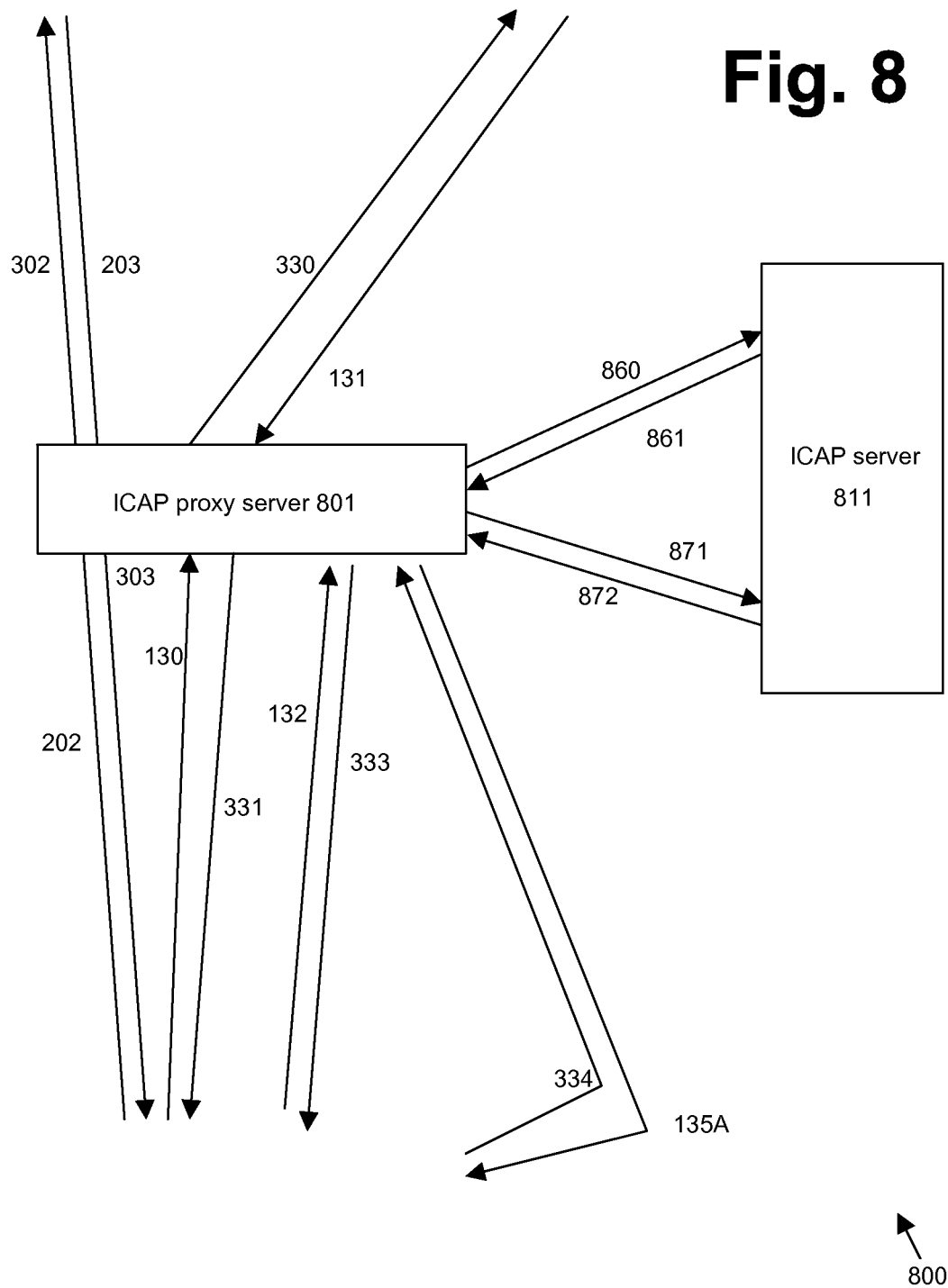
FIG. 8 illustrates a portion of a computer system arranged in accordance with a seventh embodiment of the invention.

FIG. 8 shows a system 800 that may be used to replace the proxy add-in 311 of the system 300. FIG. 8 shows an internet content adaptation protocol (ICAP) enabled proxy server 801 and an ICAP server 811. Some parts of the system 800 are common with the system 300 and so, for the convenience of the reader, some of the HTTP requests and HTTP responses are shown on FIG. 8. As those skilled in the art will appreciate, ICAP is an IETF standard protocol described in RFC 3507(http://www.ietf.org/rfc/rfc3507.txt) that allows an Internet proxy server to perform functions such as virus scanning, language translation or content filtering. The ICAP protocol allows proxy servers to send queries to one or more content-adaptation server over a private network (such as an ISP's internal LAN) or over a public IP-based network (such as the public Internet).

Compared to the system 300, the proxy server 801 replaces the proxy server 301 while the ICAP server 811 replaces the proxy add-in 311. In this embodiment the ICAP server 811 is a server that is connected to the helper server 340 via the Internet and is connected to the proxy server 801 by an Ethernet link. The ICAP server 811 does not itself need to have a direct connection to the helper server 340, since communication in preferred proxy-based embodiments operates by making the web browser 110 issue HTTP requests by means of HTTP 302 redirect responses. The proxy server 801 includes an ICAP client which communicates with the ICAP server 811.

The system 800 may be used to intercept and modify outgoing HTTP requests 130 from a user's PC 101 and/or incoming HTTP responses 131 to the user's PC 101. As some features of the system 800 are similar to those of the system 300, a description of the operation of the system 800 will be provided in terms of the system 300.

Consider firstly an outgoing HTTP request 130 from the user's PC 101.

When the proxy server 801 receives the HTTP request 130, the proxy server 801 sends a message 860 over the Ethernet link to the ICAP server 811. The message 860 includes a copy of the HTTP request 130. The ICAP server 811 first checks that the FQDN in the URI of the HTTP request 130 resolves to a real IP address. The ICAP server 811 checks that the FQDN resolves by using a DNS server. An example of a situation where the FQDN would not resolve to a real IP address is if the web site name in the HTTP request 130 has been incorrectly specified such that DNS resolution of the web site name fails. Assuming that the FQDN does resolve to a real IP address, the ICAP server 811 then checks whether or not there is a web server 120 listening at the IP address that is given by the DNS resolution. If there is a web server 120 listening then the ICAP server 811 sends a message 861 back to the proxy server 801. The message 861 includes the un-modified HTTP request 130 which is sent by the proxy server 801 as an HTTP request 330 over the Internet to the web server 120.

If the DNS resolution fails or if the web server 120 is not processing HTTP requests then the ICAP server 811, instead of sending a message 861 including the un-modified HTTP request, causes the proxy server 801 to send an HTTP re-direct response 331 to the web browser 110 on the user's PC 101. As was described above, the HTTP re-direct response 331 causes the web browser 110 to send an HTTP request 132 to the helper server 340. The helper server 340 then performs a context analysis as was described above.

As those skilled in the art will appreciate, instead of sending an HTTP re-direct response 331 to the web browser 110, the ICAP server 811 could be arranged to send a message 861 to the proxy server 801 in which the header of the HTTP request is modified. The proxy server 801 then sends out the modified HTTP request to the internet. The HTTP request is modified so that instead of being addressed to the web server 120, the HTTP request specifies the helper server 340 as the destination. The helper server 340 then performs a context analysis as was described above.

Consider secondly an incoming HTTP response 131 from the web site 120.

When the proxy server 801 receives the HTTP response 131 from the web server 120, the proxy server 801 sends a message 871 to the ICAP server 811. The message 871 includes a copy of the HTTP response 131. The ICAP server 811 examines the header of the HTTP response 131 to determine whether the web page (or other resource) that was requested by the user was successfully retrieved from the web server 120. If the status code of the HTTP response 131 indicates that the web page was successfully retrieved then the ICAP server 811 sends a message 872 to the proxy server 801; the message 872 informs the proxy server 801 that the HTTP response 131 should be passed unmodified to the user's PC 101.

If the status code of the HTTP response 131 indicates that the web page was not successfully retrieved then, in this embodiment, the ICAP server 811 also examines the length (i.e. the number of characters) of the body (as opposed to the header) of the HTTP response 131. If the length of the body is below a threshold length then the ICAP server 811 sends a message 872 that instructs the proxy server 801 to replace the HTTP response 131 with an HTTP re-direct response 331. The HTTP re-direct response 331 causes the web browser 110 to send an HTTP request 132 to the helper server 340. The helper server 340 then performs a context analysis as was described above.

In some embodiments, the ICAP server 811 may be arranged to check only the status code of an HTTP response 131 instead of checking both the status code and the body length of an HTTP response 131.

In the embodiment described above, the ICAP server 811 communicated with a DNS server and with a web server 120 in order to check that an outgoing HTTP request 130 would be responded to by the web server 120. In some embodiments the ICAP server 811 includes a timer for determining whether too much time has elapsed since either the DNS server or the web server 120 was interrogated. If too much time has elapsed then the ICAP server 811 deems that an error has occurred and causes the proxy server 801 to send an HTTP re-direct response 331 to the web browser 110.

As those skilled in the art will appreciate, many web pages comprise a plurality of images. Such web pages contain HTML information that specifies from where the images can be downloaded. Once such a web page has been loaded into a web browser 110, the web browser 110 then issues an HTTP request for each of the images. It is preferred that the ICAP server 811 ignores the HTTP status of requests for images (e.g. in the file formats .jpg and .png) and executable files (e.g. in the format .exe). In some cases, for example where the requested URL ends in common image or other non-HTML-page object filename extensions (.gif, .css, .jpg, .map), it is possible to configure the proxy server 801 not to query the ICAP server 811 at all. This reduces load on the communications channel (Ethernet or Internet) between the proxy server 801 & ICAP server 811 and reduces load on the ICAP server 811. In other cases, the URL may not indicate the data type and the ICAP server 811 has to make the determination. One method is to examine the text of previously returned HTML pages for the URLs of embedded objects and to store these in a database for a set period of time. When the ICAP server subsequently receives the request for the embedded object, it can detect them from the database. (To prevent the database from growing indefinitely, older URLs may be discarded once they have been there for a certain amount of time. This kind of cache management is well known in the art.)

Further Embodiments

The systems 100, 200, 300, 400, 700 and 800 described above obtained context information from either (i) the FQDN, (ii) a web page with a defective link or (iii) from an auxiliary server (such as the whois server 701 or the what_is server 702). As those skilled in the art will appreciate, in alternative embodiments, the systems are modified so that as well as, or in addition to, obtaining context information from those sources, the systems also attempt to obtain context information from the home page of the web site with the unobtainable web page. For example, suppose the user either types in a URL, or clicks on a link, for example the hypothetical web page:

www.valid_domain_name.com/missing_page.html where the FQDN validly specifies a domain name but where the path does not specify a valid web page for that domain name. In this alternative embodiment, the system is arranged to load the homepage for the website. Most web sites are arranged so that, if no path specifying a particular web page is provided, then the web site returns by default a web page called "index.html". Thus in this alternative embodiment, the web site would provide the system with the following web page:

www.valid_domain_name.com/index.html and the system would then perform a context analysis on the homepage of the website.

As those skilled in the art will appreciate, there are differences between obtaining context information from the homepage of a web site compared to obtaining context information from an auxiliary server such as a whois server 701. When the context analyser (e.g. the analysis software 141) obtains context information from the homepage (e.g. "index.html") of a website then the context analyser sends an HTTP request to the web site and performs a context analysis on the web page that is returned by the website. When the context analyser obtains context information from an auxiliary server, a two step process may need to be performed. First, the context analyser sends an HTTP request to the auxiliary server and receives an HTTP response from the auxiliary server. The HTTP response may define a web page that includes one or more fields. For example, the whois server 701 may have a field in which a user (or a computer) can enter a domain name. Once the user (or a computer) has entered a domain name and pressed the "Enter" key, the whois server 701 replies with a dynamically generated HTML web page which includes context information. The context analyser then analyses the dynamically generated HTML web page for, for example, keywords.

Further embodiments will now be discussed. For convenience, most of the following embodiments will be presented in terms of the systems 100, 200, 300 or 400. Those skilled in the art will appreciate that many of the embodiments could also be applied to the systems 700 and 800, or to the fifth embodiment.

As those skilled in the art will appreciate, other amendments may be made to the systems 100, 200, 300 or 400, or to the fifth embodiment. For example, instead of using software to implement the analysis software 141, 241, index database software 142 and web page creation software 143, dedicated hardware may be used to perform the same functions.

The systems 100, 200, 300, 400 integrated the analysis software 141, 241, the index database software 142, 342 and the web page creation software 143 with the helper server 140, 240, 340. In alternative embodiments, the helper server does not include that functionality but instead has communication links to other servers which implement the required functionality. For example, in one alternative embodiment, the helper server, on receipt of an HTTP request 232 and a HTTP response 221 communicates the information to "context" software which deduces the context and returns the context to the helper server. The helper server then communicates the context to a database server which provides details of the relevant links directly to a web page creation server. The web page creation server then generates the required web page and sends this to the helper server for transmission to the web browser software 110.

The systems 100, 200, 300, 400 do not typically communicate the internet protocol (IP) address of the user's PC 101 to the helper server 140, 240, 340, 440. In alternative embodiments, the user's IP address is sent as a parameter to the helper server. This is used to improve the context information by taking account of the approximate geographic location of the user's PC 101. This allows the relevance of, for example, credit cards or other financial services to be improved, or allow appropriate retailing of heavy or bulky goods, or of language translation services.

In alternative embodiments, the helper server is arranged to cache requests and indexing so as to improve the speed of response to the user. For example, if a web server 120 becomes temporarily unavailable, it is possible that different users will attempt to access pages on the web server 120 and thus similar "404 Not Found" errors will repeatedly occur.

In an alternative embodiment, the plug-in 111, 211, or the proxy add-in 311, generates a persistent "globally unique identifier" that uniquely identifies a particular user. In this alternative embodiment, it is arranged that the globally unique identifier cannot be traced to an individual, thereby ensuring privacy. By including the globally unique identifier as a parameter to the helper server, the helper server can take account of the browsing habits of the user, thus improving the context and thus relevance of the links presented to the user. In similar embodiments, the globally unique identifier may be implemented as persistent cookies on the user's PC 101. Similarly, the participant ID may be stored as a persistent cookie on the user's PC 101. In other embodiments the participant ID is not used to record which organization distributed, say, the plug-in 211 to the user but is used as a persistent globally unique identifier or to categorise the user according to a stereotype, for example to indicate that the user tends to be interested in chemistry or choreography.

In some circumstances, it is possible that a combination of the systems 100, 200, 300 and 400 are simultaneously present. For example, a user's PC 101 having a plug-in 211 may access the internet through a proxy 301 having a proxy add-in 311, to access a web server 420 incorporating an error handler 411. In this case, the error handler 411 would dominate the proxy add-in 311 and the plug-in 211 as no "404 Not Found" error response would be returned to the user's PC 101. As those skilled in the art will appreciate, the behaviour of the error handler 411 may be modified so that it provides information that can be checked by the proxy add-in 311 and the plug-in 211, so as to enable sharing of remuneration between the various organisation(s) that supply the error handler 411, proxy add-in 311 and plug-in 211.

In alternative embodiments, the plug-in 211 is arranged to include the more recent web page addresses (URLs) that the user visited (e.g. the previous five web servers) to provide additional context information. Similarly, the error handler 411 may be modified to provide a limited implementation of the same functionality by the use of session cookies on the user's PC 101 to store the more recent web page addresses visited by the user.

In still further alternative embodiments, a plurality of helper servers may be provided. In one embodiment, each user is directed to a particular helper server so as to balance the load between the various helper servers, for example, to distribute the computational load or the internet traffic equally between the various helper servers. Alternatively, different users may be directed to different helper servers on the basis of a participant ID 212. A plurality of ICAP servers may also be used to distribute the load and/or provide redundancy in the event of failure of one of the ICAP servers. In addition, ISPs generally use multiple proxy servers. In this case, a single ICAP server 811 may provide services for more than one ICAP-enabled proxy server 801.

The web page creation software 143 of the systems 100, 200, 300, 400, created a web page to be viewed by a user on a display 104. In some situations, the user may not be able to readily view a display, for example, if the user is driving. Thus, in an alternative embodiment, modified web browser software is used to produce an output that is communicated to the user, for example, by text-to-speech conversion software so that the user listens to the ranked links and selects a link by speaking to the web browser to select a link.

The systems 100, 200, 300, 400 used either a plug-in 111, 211, a proxy add-in 311 or a error handler 411 in combination with a helper server 140, 240, 340, 440. In alternative embodiments, some or all of the functionality of the helper server is included in the plug-in 111, 211, proxy add-in 311 or the error handler 411. In other alternative embodiments, the user's PC implements a web server and the functionality of the plug-ins 111, 211, proxy add-in 311 or the error handler 411 is part of the user's PC 101. For example, as those skilled in the art will appreciate, the functionality of any/some/all of the plug-ins 111, 211, proxy add-in 311 or error handler 411, analysis software 141, index database software 142 and web page creation software 143 may be implemented as part of the operating system of the user's PC.

In some embodiments, rather than presenting a user with a list of alternative links for the user to consider and select, a re-direction HTTP response is sent to the user's PC 101 which causes whichever link is deemed to be most relevant to be directly displayed on the display 104.

Revenue can be obtained on the basis of cost per click (CPC), cost per lead (CPL), cost per action (CPA), cost per customer, cost per thousand (CPM, where "M" is the Roman numeral for 1000), cost per sale (CPS) or cost per order (CPO). Different categories of links may be allocated different values. For example, leads to mortgage suppliers may be allocated a high financial value due to the fact that mortgage contracts are typically of high value. Sometimes the owner of a website will pay an organisation to "host" the website on a web server owned by the organisation. In this situation, the remuneration would be received from the owner of the website rather than the owner of the web server.

It was earlier mentioned that "404 Not Found" and "410 Gone" status codes were suitable examples where the user interface could be improved. As those skilled in the art will appreciate, other HTTP status codes to which this user interface may be applied include (but are not limited to):
    400 Bad Syntax,
    401 Unauthorized,
    402 Not Used,
    403 Forbidden,
    500 Error in server,
    501 Not Implemented,
    502 Overloaded, and
    503 Gateway Timeout.

In the system 400, the helper server 440 was connected to an auxiliary server 460 which included analysis software 241 and index database software 242. In alternative embodiments of the systems 100-400, web servers (not shown) provided by third parties may be used to perform the context analysis. In such embodiments, the plug-in 111, 211, proxy add-in 311 or error handler 411 is arranged, on receipt of an HTTP status code, to send context information to the third party server. The third party server analyses the context information and sends a list of potential links to the helper server which then causes a web page to be generated and sent to the user.

The systems 100-400 used index database software to determine links of potential relevance to the user. The links were then presented to the user. In some circumstances, it may be preferable to ensure that a user does not have to wait for too long before receiving some results. In an alternative embodiment, the analysis software and the index database software are arranged so that the first time that a URL specifying a particular non-existent page is entered by a user, links are presented to the user based on a relatively brief analysis of the context information. This ensures that the user does not have to wait for too long. Meanwhile, the analysis software and the index database software are arranged to analyse the context information in more detail and determine a new list; it is likely that this new list will be more relevant to the context than the list of links originally presented to the user as the analysis software and the index database software will have had more time for analysis. If a different user subsequently enters the same URL, or if the original user enters the same URL a second time, then the new list is presented. An advantage of this embodiment is that the response time until links are returned to a user is kept reasonably short while allowing for relatively detailed context analysis. In a further development of this alternative embodiment, the web page creation software 143 is arranged to generate a "frameset" web page that contains two or more "frames". As those skilled in the art will appreciate, a frameset web page appears to the user as a single web page but each of the frames may originate from a different web server. For example, a frame may contain a reference instructing the web browser to retrieve the home web page of a particular web server. In this further development, the web page creation software is arranged so that a frame including links found after a relatively brief analysis is displayed first. If the user has sufficient patience to wait longer, a frame including links found after a more detailed context analysis is also displayed.

In the systems 100-400, a modem 105 was used to connect the user's PC 101 to the internet. In other embodiments, PC 101 includes other devices using the HTTP, wireless access protocol (WAP) or a similar protocol to request and receive information from a web server. The various embodiments of the invention are also applicable to networks that do not use the HTTP and HTML protocols. Similarly, the various embodiments of the invention are applicable to "intranets" instead of the Internet. As those skilled in the art will appreciate, intranets are typically private networks that are either not connected to the Internet or are separated from the Internet by a firewall.

In the systems 100-400, a helper web server 140, 240, 340, 440 was used to present the user with potentially relevant links when the user could not access requested information from a web server 120, 420. The helper web server and the web server were distinct web servers. In alternative embodiments, the web server and the helper web server may not only have the same IP address but may also be the same web server i.e. the helper web server helps itself. An advantage of such embodiments is that the response time in providing the user with relevant links can be minimised. For example, when compared to the HTTP requests 220 and HTTP responses 221 of systems 200-400, the need in such alternative embodiments for information to travel over physically large distances is avoided.

The system 200 used participant monitoring software 242 and tracker software 243 to allow the helper server 240 to determine the allocation of remuneration. In alternative embodiments, the plug-in 211 (for example) is modified so that the modified plug-in is used to determine the allocation of remuneration. In this alternative embodiment, the HTTP request 234 and the HTTP response 235 are not needed as the HTTP response 233 is modified to include the actual links to linked servers 150 (rather than links to the helper server 240 which include the URL of the linked servers 150). When the user clicks on a link, the modified plug-in 211 records this and, if applicable, the participant ID so that the remuneration can be shared.

FIGS. 1-4 show various locations (between a user's PC 101 and web servers 120, 420) where error codes may be intercepted and used to initiate a context analysis of incorrect URLs. As those skilled in the art will appreciate, many Internet Service Providers (ISPs) buy internet bandwidth from carriers who are typically major telecommunication companies. The carriers typically own and maintain, for example, transatlantic fibre-optic cables and switch/routing equipment. In some embodiments, web proxies may be incorporated into switch/routing equipment. Such proxies would operate in a similar way to the proxy server 301 shown in FIG. 3.

For the fifth embodiment, five examples of situations were given in which an error could occur without an HTTP status code being generated. In the first situation, the plug-in 111, 211 or proxy add-in 311 were arranged to receive error codes from a DNS server and then behave as if an HTTP error had occurred. In an alternative embodiment, a DNS server is modified to change the behaviour of the DNS server in the event that a domain name cannot be resolved into an IP address. The modified DNS server may, for example, be modified by the use of a DNS add-in (not shown) analogous to the proxy add-in 311.

Normally, when a user clicks on a link, the browser uses a DNS server to resolve the domain name into an IP address. Once the browser receives the IP address from the DNS server, the browser sends the HTTP request to a host at the IP address specified by the DNS server.

In the event that a non existent domain name (for example 'www.some_non_existent_domain.com') is sent to a modified DNS server, instead of indicating that a DNS error has occurred, the modified DNS server returns the IP address of a helper server 140, 240, 340, 440. The IP address of the helper server is communicated by the Internet to the web browser 110 which then sends an HTTP request to the helper server 140, 240, 340, 440.

Alternatively, instead of modifying a DNS server, a proxy DNS server may be used as an intermediary between a user's PC and a DNS server. In this case, the proxy DNS server receives DNS status codes (including DNS error codes) from the DNS server. In the event that a domain name is invalid, resulting in a DNS error code from the DNS server, then the proxy DNS server intercepts the DNS error code received from the DNS server and replaces (or amends) the received DNS error code with a DNS status code which includes the IP address of a helper server 140, 240, 340, 440.

If the user had either typed in a URL, or clicked on a link, which included path information (for example 'www.some_non existent_domain.com/path/page.html') then the web browser would send the path information to the IP address of the helper server. Thus the helper server would be able to perform a context analysis as described earlier. Note that in cases where the user clicked on a link, the address of the web page (that is, the web page having the link specifying a non existent domain name) would also be sent to the helper server.

As mentioned earlier, the various embodiments of the present invention may be applied to Internet web pages. Such web pages may include, for example, images. As those skilled in the art will appreciate, images on a web page are typically denoted using the HTML/XHTML tag "<img>". One of the attributes of the <img> tag is "src" which specifies the URL of the image that is to be displayed as part of the web page. When performing a context analysis, embodiments of the present invention may be arranged to analyse the src attribute. For example, if a src attribute specified the URL "www.some domain name.com/images/elephant.jpg" then the context analysis could determine that the image was called "elephant" and was in the JPEG format.

However, in some situations the name of the image to be displayed may not be indicative of the contents of the image. For example, an image may be called "img0001" but may show a picture of an elephant. In such cases, embodiments of the present invention may be arranged to retrieve the image and perform image processing of the image. Those skilled in the art will, of course, appreciate that processing a monochrome image to detect representations of circles and squares will require less computer processing power than the detection of more complicated representations such as that of an elephant. Similarly, embodiments may be arranged to analyse music (for example music in the MPEG layer 3 format, also known as MP3 file format) filenames or the music represented by music files to determine, for example, whether a music file represents Classical music or Jazz music.

In other situations, a web page may contain a defective link but may also contain valid links. Those skilled in the art will also appreciate that embodiments of the present invention may be arranged, if the user selects the defective link, to retrieve web pages specified by the valid links and analyse those web pages for context information.

We claim:

1. A system configured to respond to a second web page not being sent from a web server to a web browser following a selection of a link on a first web page, said link specifying the second web page, comprising:

a terminal for use by a user, wherein the terminal comprises a processor configured by executing software instructions stored in a memory and the web browser operable to request web pages on behalf of the user;

a web server communicatively connected to the terminal over a network and operable to receive the selection of the link on the first web page specifying the second web page from the web browser;

an error detector, wherein the error detector is operable to generate a hypertext transfer protocol (HTTP) error code when, following the selection of the link on the first web page specifying the second web page, the second web page is not sent from the web server to the web browser due to the link being a broken link;

an error code receiver, wherein the error code receiver is operable to receive the HTTP error code from the error detector and, in response, cause information to be sent to a context analyser identifying the first web page;

a context analyser operable to: receive the information identifying the first web page from the error code receiver, analyse the content of the first web page to determine a location of the link on the first web page and at least one or more keywords in a vicinity of the location of the link on the first web page, analyse at least the one or more keywords but less than the entire first web page to determine information regarding the context of the link specifying the second web page and thereby deduce information regarding the context of the second web page, establish a list of one or more web pages that are relevant to the context of the second web page on the basis of the so determined information regarding the context of the link specifying the second web page, and communicate the list to a response generator; and a response generator, wherein the response generator is operable to generate a response based on the list and to communicate the response to the web browser.

2. A system according to claim 1, wherein the system comprises a DNS server, and wherein the error detector is operable to generate an error code responsive to a DNS resolution failure of the web page as requested by the web browser.

3. A system according to claim 2, wherein the error detector is embodied as a DNS add-in that operates in conjunction with the DNS server.

4. A system according to claim 1, wherein the error detector is operable to generate an error code when the web page as requested by the web browser is not available to the web browser.

5. A system according to claim 4, wherein the web server comprises the error detector.

6. A system according to claim 4, wherein the web browser comprises the error detector.

7. A system according to claim 1, wherein the error detector comprises a timeout detector operable to cause the error detector to generate an error code when a request for a web page has timed out.

8. A system according to claim 1, wherein the terminal comprises one of a desktop PC, a mobile telephone and a personal digital assistant.

9. A system according to claim 1, wherein the error code receiver is embodied as a plug-in that operates in conjunction with the web browser.

10. A system according to claim 1, wherein the error code receiver is embodied as a proxy add-in that operates in conjunction with a proxy web server.

11. A system according to claim 1, wherein the error code receiver is embodied as a server that operates in conjunction with a proxy web server to modify the behaviour of the proxy web server.

12. A system according to claim 1, wherein the error code receiver is embodied as an error handler that operates in conjunction with a second web server other than the web server.

13. A system according to claim 1, wherein the context analyser and response generator are embodied as a helper web server.

14. A system according to claim 1, wherein the error code receiver, the context analyser and the response generator are embodied as a plug-in that operates in conjunction with the web browser.

15. A system according to claim 1, comprising a helper web server in communication with the context analyser and the response generator.

16. A system according to claim 1, wherein the context analyser comprises a database that indexes web pages with keywords.

17. A system according to claim 1, wherein when the second web page is not sent to the terminal, the context analyser is operable to:
retrieve a web page other than the second web page, and
analyse the other web page to determine context information.

18. A system according to claim 17, wherein the context analyser is operable to: (i) determine a history of one or more web pages having links and also determining which links led the user to the second web page, (ii) retrieve the one or more web pages, and (iii) analyse the one or more web pages to determine context information.

19. A system according to claim 17, wherein the context analyser is operable to retrieve a homepage associated with the second web page, and to analyse the homepage to determine context information.

20. A system according to claim 17, wherein the context analyser is operable to retrieve a web page from an auxiliary server, and to analyse the retrieved web page to determine context information.

21. A system according to claim 20, wherein the auxiliary server comprises a whois server.

22. A system according to claim 20, wherein the auxiliary server is a first auxiliary server, wherein the context analyser is operable to use context information determined from a web page retrieved from the first auxiliary server as an input to a second auxiliary server, wherein the context analyser is operable to retrieve a web page from a second auxiliary server in response to the input, and wherein the context analyser operable to analyse the web page retrieved from the second auxiliary server to determine context information.

23. A system according to claim 22, wherein the second auxiliary server comprises a what is server.

24. A system according to claim 17, wherein the context analyser is operable to analyse the one or more web pages to determine keywords as context information.

25. A system according to claim 1, wherein the error code receiver stores participant ID information, wherein the error code receiver is operable to send to the context analyser the participant ID information, and wherein the context analyser is operable to interpret the participant ID information as information regarding the context of the web page requested by the web browser.

26. A system according to claim 1, wherein the response generator is operable to send a response to the web browser to re-direct the web browser to one of the web pages of the list of one or more web pages that may be of interest to the user.

27. A system according to claim 1, wherein the response generator is operable to generate a web page and send the web page to the terminal.

28. A system according to claim 27, wherein the web page contains one or more links to one or more respective web pages that may be of interest to the user.

29. A system according to claim 28, wherein the context analyser stores linked ID information in association with the one or more links to one or more respective web pages, wherein the context analyser is operable to convey the linked ID information to the response generator, and wherein the response generator is operable to include respective linked ID information in the one or more links of the generated web page.

30. A system according to claim 27,
wherein the response generator is operable to generate a preliminary web page based on a preliminary list received from the context analyser, and
wherein the response generator is operable to generate a supplementary web page based on a supplementary list received from the context analyser.

31. A system according to claim 30, wherein the response generator is operable to generate a web page comprising a frameset wherein one of the frames of the frameset specifies the preliminary web page and another of the frames of the frameset specifies the supplementary web page.

32. A system according to claim 1, wherein the context analyser and response generator are a helper web server,
wherein the error code receiver stores participant ID information,
wherein the error code receiver is operable to cause the participant ID information to be conveyed to the response generator,
wherein the response generator is operable to generate a web page containing one or more links that point to the helper server and to send the generated web page to the terminal, wherein each of the one or more links of the generated web page includes (i) information specifying a respective one of the one or more web pages that may be of interest to the user and (ii) the participant ID information, and
wherein the helper server is operable to receive a web page request from the terminal that includes information specifying a web page and the participant ID information and, in response to the web page request, send a response to the web browser to re-direct the web browser to the web page specified in the web page request and increment a counter associated with the participant ID information.

33. A system according to claim 32, further comprising a plurality of counters, each counter being associated with respective participant ID information.

34. A system according to claim 32, wherein the error code receiver is operable to convey the participant ID information to the context analyser, and wherein the context analyser is operable to convey the participant ID information to the response generator.

35. A system according to claim 1, further comprising one or more linked servers, wherein the one or more linked servers store web pages that may be of interest to the user.

36. The system of claim 1, wherein the context of the link comprises a web address of the second web page that is included in the first web page.

37. The system of claim 1, wherein the context of the link comprises at least one linked keyword that corresponds to the link included in the first web page.

38. The system of claim 1, wherein the context of the link comprises at least one keyword that is included in the first web page and is within the vicinity of the link, and wherein the vicinity of the link is a threshold number of keywords from the location of the link.

39. The system of claim 1, wherein the first web page is the only web page analysed to determine information regarding the context of the link specifying the second web page.

40. A system comprising: an error code receiver communicatively connected to a context analyser of the type that responds to a second web page not being sent to a web browser following a selection of a link on a first web page due to the link being a broken link, said link specifying the second web page, and which is configured to receive information identifying the first web page from an error code receiver, analyse at least a location of the link on the first web page and at least one or more keywords in a vicinity of the location of the link on the first web page but less than the entire first web page to determine information regarding the context of the link specifying the second web page and thereby deduce information regarding the context of the second web page, establish a list of one or more web pages that are relevant to the context of the second web page on the basis of the so determined information regarding the context of the link specifying the second web page, and communicate the list to a response generator, the response generator being operable to generate a response based on the list and to communicate the response to the web browser, the error code receiver being arranged to receive, in at least one computing device comprising a processor configured by executing software instructions stored in a memory, a hypertext transfer protocol (HTTP) error code from an error detector, wherein the HTTP error code is indicative that, following the selection of the link on the first web page specifying the second web page, the second web page was not sent to the web browser;
the error code receiver being arranged to cause, in the at least one computing device, in response to receiving the error code, information identifying the first web page to be sent to the context analyser.

41. An error code receiver according to claim 40, wherein the error code receiver is operable to cause information to be sent to the context analyser by sending a HTTP re-direct response to the web browser.

42. An error code receiver according to claim 40, wherein the error code receiver is a plug-in for a web browser.

43. An error code receiver according to claim 42, wherein the plug-in further comprises a web browser.

44. An error code receiver according to claim 40, further comprising a proxy add-in for a proxy server.

45. The plug-in according to claim 44 further comprising a proxy server.

46. A server computer for modifying the behaviour of a proxy server in response to a second web page not being sent to a web browser following a selection of a link on a first web page, said link specifying the second web page, comprising:
a processor configured by executing software instructions stored in a memory,
means for transferring messages between the server computer and a proxy server over a network;
an error code receiver according to claim 40, operable to analyse messages to determine whether a message contains an error code.

47. A server computer according to claim 46, wherein the error code receiver is operable to measure the length of a message, and operable to cause the information regarding the first web page to be sent to a context analyser when both the length of a message exceeds a threshold and the message contains the error code.

48. A server computer according to claim 46, comprising a network connection for communicating with a DNS server.

49. A server computer according to claim 46, comprising a network connection for communicating with a web server.

50. A server computer for modifying the behaviour of a proxy server in response to a second web page not being available to be sent to a web browser following a selection of a link on a first web page, said link specifying the second web page, comprising:
 a processor configured by executing software instructions stored in a memory,
 means for transferring messages between the server computer and a proxy server;
 an error detector, operable to analyse messages resulting from the selection of the link on the first web page specifying the second web page, and operable to generate an error code when the second web page is not available to be sent to the web browser;
 an error code receiver according to claim 40, operable to receive error codes from the error detector.

51. A server computer according to claim 50, wherein the error detector comprises a timer configured to indicate a time taken for determining whether a second web page has taken too long to be sent to a web browser.

52. A server computer according to claim 50, wherein the error code receiver is also operable to analyse messages to detect the error codes.

53. An error code receiver according to claim 40, wherein the error code receiver is an error handler for a web server.

54. An error code receiver according to claim 53, further comprising a web server.

55. An error code receiver according to claim 40, wherein the error code receiver is a DNS add-in for a DNS server.

56. An error code receiver according to claim 55, further comprising a DNS server.

57. A computer program product embodied in a non-transitory computer readable medium defining processor interpretable instructions for causing a processor to implement an error code receiver according to claim 40.

58. A computer program product embodied in a non-transitory computer readable medium according to claim 57, wherein the computer program product is downloadable over a network.

59. A computer program product embodied in a non-transitory computer readable medium according to claim 58, wherein the computer program product comprises data downloadable from the internet.

60. A server computer for modifying the behaviour of a proxy server, the server computer being communicatively connected to a context analyser of the type that responds to a second web page not being sent to a web browser following a selection of a link on a first web page due to the link being a broken link, said link specifying the second web page, and which is configured to receive information identifying the first web page from an error code receiver, analyse at least a location of the link on the first web page and at least one or more keywords in a vicinity of the location of the link on the first web page but less than the entire first web page to determine information regarding the context of the link specifying the second web page and thereby deduce information regarding the context of the second web page, establish a list of one or more web pages that are relevant to the context of the second web page on the basis of the so determined information regarding the context of the link specifying the second web page, and communicate the list to a response generator that is operable to generate a response based on the list and to communicate the response to the web browser, comprising:
 a processor configured by executing software instructions stored in a memory,
 a communication means for transferring messages between the server computer and a proxy server, wherein the communication means is operable to transfer Internet Content Adaptation Protocol (ICAP) messages; and
 the error code receiver, arranged to:
  receive, in at least one computing device, an error code from an error detector, wherein the error code is indicative that, following the selection of the link on the first web page specifying the second web page, the second web page was not sent to the web browser;
  cause, in the at least one computing device, in response to receiving the error code, information identifying the first web page to be sent to the context analyser; and
  wherein the error code receiver is operable to analyse messages to determine whether a message contains the error code.

61. A context analyser, executable in at least one computing device comprising a processor configured by executing software instructions stored in a memory, that is operable, in an event that, following the selection of a link on a first web page specifying a second web page, the second web page is not sent from a web server to a web browser, to:
 receive information identifying the first web page from a hypertext transfer protocol (HTTP) error code receiver, analyse at least a location of the link on the first web page and at least one or more keywords in a vicinity of the location of the link on the first web page but less than the entire first web page to determine information regarding the context of the link and thereby deduce the context of the second web page, establish a list of one or more web pages that are relevant to the context of the second web page on the basis of the so determined information regarding the context of the link specifying the second web page, and communicate the list to a response generator that is operable to generate a response based on the list and to communicate the response to the web browser.

62. A context analyser according to claim 61 wherein the context analyser is a helper server.

63. A context analyser according to claim 62, the helper server comprising a response generator, wherein the response generator is operable to generate a response based on the list and to communicate the response to the web browser.

64. A method of providing a user with a user interface responsive to a second web page not being available to be sent to a web browser following a selection of a link on a first web page, said link specifying the second web page, the method comprising the steps of:
 selecting the link on the first web page specifying the second web page;
 detecting that the second web page as requested by the web browser is not available to be sent to the web browser due to the link being a broken link and, in response, generating a hypertext transfer protocol (HTTP) error code;
 receiving the HTTP error code and, in response, analyzing at least a location of the link on the first web page and at least one or more keywords in a vicinity of the location of the link on the first web page but less than the entire first web page to determine the context of the selected link and thereby deduce the context of the second web page and thereby establishing a list of one or more web pages that are relevant to the context of the second web page and may be of interest to the user on the basis of the so determined information regarding the context of the link specifying the second web page, and generating a response based on the list and communicating the response to the user.

65. A system responsive to a second web page being inaccessible following a selection in a web browser of a link on a first web page, said link specifying the second web page, comprising at least one computing device comprising a processor configured by executing software instructions stored in a memory, an error code receiver executable in the at least one computing device, a context analyser executable in the at least one computing device and a response generator executable in the at least one computing device, wherein:

the error code receiver is operable to receive a hypertext transfer protocol (HTTP) error code and, in response, cause information to be sent to a context analyser, the HTTP error code being indicative of the selection in the web browser of the link on the first web page specifying the second web page and the second web page being inaccessible due to the link being a broken link and the information including information identifying the first web page;

the context analyser being operable to: receive the information from the error code receiver, analyse at least a location of the link on the first web page and at least one or more keywords in a vicinity of the location of the link on the first web page but less than the entire first web page to determine information regarding the context of the link and thereby deduce the context of the second web page, establish a list of one or more web pages that are relevant to the context of the second web page on the basis of the so determined information regarding the context of the link specifying the second web page, and communicate the list to a response generator; and the response generator being operable to generate a response based on the list and to communicate the response to the web browser.

66. A system responsive to a second web page being inaccessible following a selection of a link on a first web page, said link specifying the second web page, comprising a processor configured by executing software instructions stored in a memory, an error code receiver, a context analyser and a response generator, wherein:

the error code receiver is operable to intercept a hypertext transfer protocol (HTTP) error code sent from a server computer to a client computer and, in response, cause information to be sent to a context analyser, the HTTP error code being indicative of the selection, at the client computer, of the link on the first web page specifying the second web page and the second web page being inaccessible and the information including information on the first web page;

the context analyser being operable to: receive the information from the error code receiver, analyse at least a location of the link on the first web page and at least one or more keywords in a vicinity of the location of the link on the first web page but less than the entire first web page to determine information regarding the context of the link and thereby deduce the context of the second web page, establish a list of one or more web pages that are relevant to the context of the second web page on the basis of the so determined information regarding the context of the link specifying the second web page, and communicate the list to a response generator; and the response generator being operable to generate a response based on the list and to communicate the response to the client computer.

* * * * *